US011447412B1

(12) United States Patent
McCune et al.

(10) Patent No.: US 11,447,412 B1
(45) Date of Patent: Sep. 20, 2022

(54) PORTABLE MULTI-STEP APPARATUS AND METHOD FOR PRODUCING POTABLE WATER

(71) Applicants: Steven Anton McCune, Franklinton, LA (US); Jeffery Paul LeBlanc, Youngsville, LA (US); Gary Wayne Bledsoe, Leakey, TX (US)

(72) Inventors: Steven Anton McCune, Franklinton, LA (US); Jeffery Paul LeBlanc, Youngsville, LA (US); Gary Wayne Bledsoe, Leakey, TX (US)

(73) Assignee: TANMAR RENTALS, LLC, Eunice, LA (US)

( * ) Notice: Subject to any disclaimer, the term of this patent is extended or adjusted under 35 U.S.C. 154(b) by 262 days.

(21) Appl. No.: 16/685,803

(22) Filed: Nov. 15, 2019

Related U.S. Application Data

(60) Provisional application No. 62/768,809, filed on Nov. 16, 2018.

(51) Int. Cl.
| | | |
|---|---|---|
| C02F 1/00 | (2006.01) |
| C02F 1/20 | (2006.01) |
| C02F 1/28 | (2006.01) |
| C02F 1/44 | (2006.01) |
| C02F 1/50 | (2006.01) |
| C02F 1/68 | (2006.01) |
| C02F 1/72 | (2006.01) |
| C02F 5/08 | (2006.01) |
| C02F 9/00 | (2006.01) |
| C01B 13/11 | (2006.01) |
| C02F 1/66 | (2006.01) |
| C02F 101/10 | (2006.01) |
| C02F 101/12 | (2006.01) |
| C02F 101/16 | (2006.01) |

(Continued)

(52) U.S. Cl.
CPC ............ *C02F 9/005* (2013.01); *C01B 13/115* (2013.01); *C02F 1/002* (2013.01); *C02F 1/20* (2013.01); *C02F 1/283* (2013.01); *C02F 1/441* (2013.01); *C02F 1/50* (2013.01); *C02F 1/66* (2013.01); *C02F 1/68* (2013.01); *C02F 1/725* (2013.01); *C02F 5/08* (2013.01); *C02F 2001/007* (2013.01); *C02F 2101/101* (2013.01); *C02F 2101/103* (2013.01); *C02F 2101/105* (2013.01); *C02F 2101/12* (2013.01); *C02F 2101/163* (2013.01); *C02F 2101/203* (2013.01); *C02F 2101/206* (2013.01); *C02F 2101/32* (2013.01); *C02F 2201/008* (2013.01); *C02F 2209/03* (2013.01); *C02F 2209/10* (2013.01); *C02F 2209/29* (2013.01); *C02F 2209/40* (2013.01); *C02F 2301/043* (2013.01); *C02F 2303/02* (2013.01); *C02F 2303/04* (2013.01); *C02F 2303/16* (2013.01)

(58) Field of Classification Search
CPC .... C02F 1/20; C02F 1/441; C02F 1/66; C02F 1/68; C02F 1/725
See application file for complete search history.

(56) References Cited

U.S. PATENT DOCUMENTS 3,965,001 A 6/1976 Irani et al.
4,162,973 A 7/1979 Lynch
(Continued)

*Primary Examiner* — Bradley R Spies
(74) *Attorney, Agent, or Firm* — Greg Mier

(57) ABSTRACT

A portable, multi-step apparatus and method for producing potable water in remote locations.

20 Claims, 15 Drawing Sheets

(51) Int. Cl.
*C02F 101/20* (2006.01)
*C02F 101/32* (2006.01)

(56) References Cited

U.S. PATENT DOCUMENTS

| | | | |
|---|---|---|---|
| 4,367,145 A | 1/1983 | Simpson et al. |
| 4,687,574 A | 8/1987 | Hellman |
| 4,925,552 A | 5/1990 | Bateson et al. |
| 5,004,537 A | 4/1991 | Brown |
| 5,062,958 A | 11/1991 | Bateson et al. |
| 6,953,525 B2 | 10/2005 | LeCraw |
| 7,074,337 B2 | 7/2006 | Miller |
| 7,077,959 B2 | 7/2006 | Petrone |
| 7,179,372 B2 | 2/2007 | Miller |
| 7,258,798 B2 | 8/2007 | LeCraw |
| 7,578,930 B2 | 8/2009 | Williamson et al. |
| 8,486,275 B2 | 7/2013 | Wolf |
| 8,518,268 B1 | 8/2013 | Nauertz |
| 9,108,868 B1 | 8/2015 | Madolora et al. |
| 9,517,950 B2 | 12/2016 | Munro |
| 9,937,443 B2 | 4/2018 | Smith et al. |
| 9,963,369 B2 | 5/2018 | Meunier |
| 10,029,922 B2 | 7/2018 | Segroves et al. |
| 10,029,924 B2 | 7/2018 | Simnioniw et al. |
| 10,131,562 B1 | 11/2018 | Madolora et al. |
| 10,441,919 B2 | 10/2019 | Oney |
| 2003/0222009 A1 | 12/2003 | LeCraw |
| 2004/0040912 A1 | 3/2004 | McConchie et al. |
| 2004/0065614 A1 | 4/2004 | Gordon et al. |
| 2004/0206681 A1 | 10/2004 | Gordon |
| 2005/0082214 A1 | 4/2005 | Max |
| 2006/0021953 A1 | 2/2006 | LeCraw |
| 2007/0119782 A1 | 5/2007 | Rawson et al. |
| 2007/0163958 A1* | 7/2007 | Newcombe ............... C02F 1/44 210/650 |
| 2008/0290032 A1 | 11/2008 | Ton That |
| 2009/0250398 A1 | 10/2009 | Meller |
| 2011/0198208 A1 | 8/2011 | Olwig et al. |
| 2011/0257788 A1* | 10/2011 | Wiemers ............... C02F 1/42 700/267 |
| 2012/0024719 A1 | 2/2012 | Botte |
| 2013/0048575 A1 | 2/2013 | Gruber et al. |
| 2013/0068698 A1 | 3/2013 | Eddy et al. |
| 2014/0076812 A1 | 3/2014 | Munro |
| 2017/0233275 A1 | 8/2017 | Segroves et al. |
| 2018/0312412 A1* | 11/2018 | Amaral ............... B01D 61/58 |

* cited by examiner

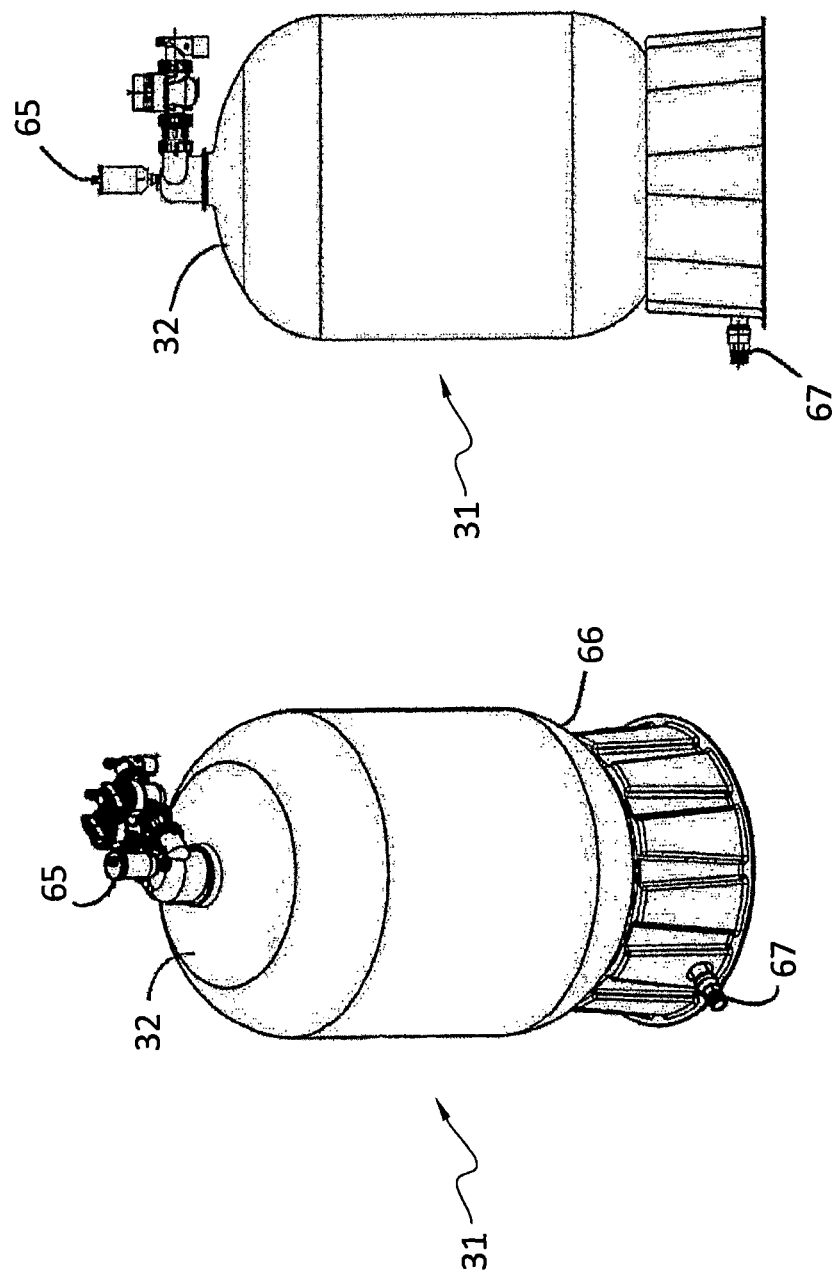

FIG. 23
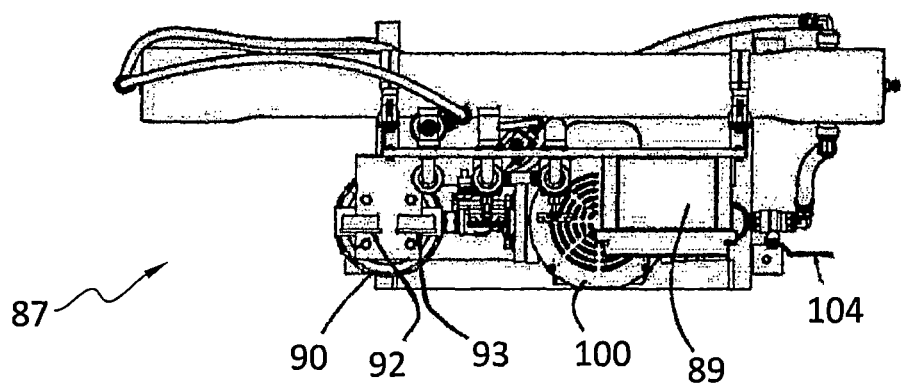
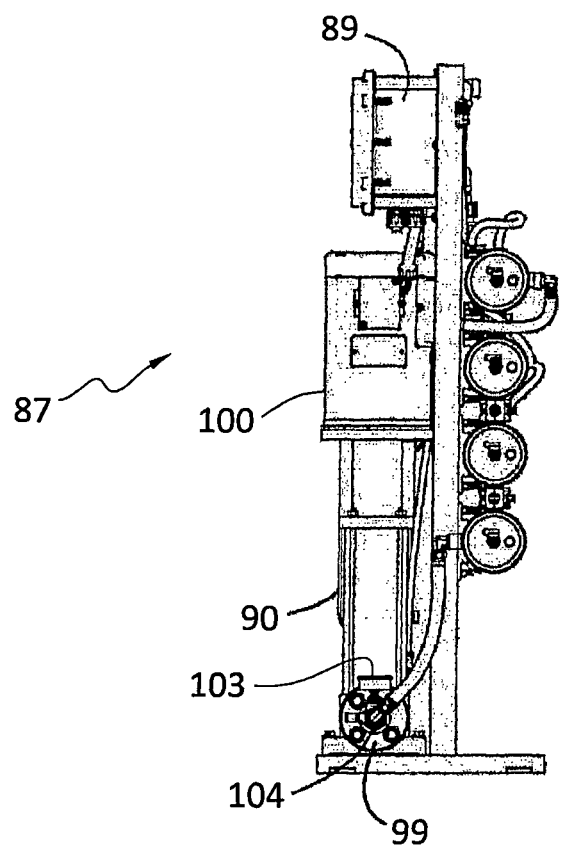
FIG. 24

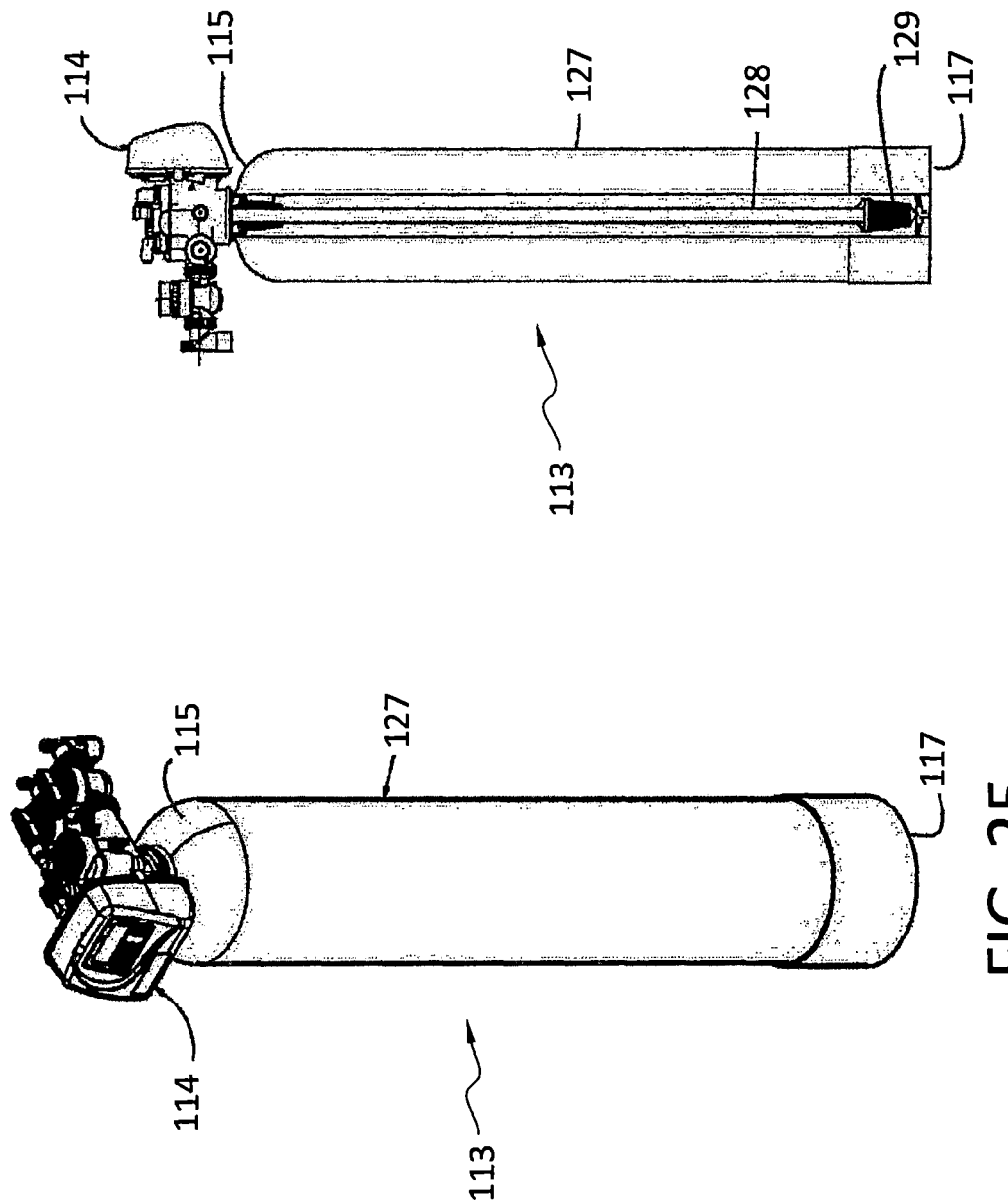

PORTABLE MULTI-STEP APPARATUS AND METHOD FOR PRODUCING POTABLE WATER

CROSS REFERENCE TO RELATED APPLICATIONS

The present application claims priority from provisional patent application No. 62/768,809, filed on Nov. 16, 2018.

FIELD OF THE INVENTION

The subject invention relates to a portable, multi-step apparatus and method for producing potable water in remote locations.

BACKGROUND

Potable water is water that is considered safe for humans to drink or to use for food preparation. Generally speaking, systems for converting non-potable water to potable water are typically designed to receive raw water, whether from surface sources, such as rivers, lakes, reservoirs, or from groundwater sources, such as wells and aquifers, and convert the raw water for distribution and consumption. The systems are typically designed to remove from the raw water dissolved solids or gases, suspended solids or gases, miscible or immiscible liquids. The goal of most such systems is to remove anything in the raw water that may be harmful to humans and that may impart undesirable color, taste, turbidity, or odor to the final product.

The field of converting non-potable water to potable water has advanced significantly over the past several years, with several foundations, researchers, and utilities contributing to groundbreaking research. For example, the process of converting non-potable water to potable water was tried in the United States in 1962 as part of the Los Angeles County Sanitation District's Montebello Forebay project, followed in 1976 by Orange County California's Water Factory 21, and again in 1978 in Fairfax County by Virginia's Upper Occoquan Service Authority. These pioneering projects were the first in the United States to use highly treated reclaimed water for potable reuse.

In 1980, the Environmental Protection Agency ("EPA") sponsored a workshop entitled Protocol Development: Criteria and Standards for Potable Reuse and Feasible Alternatives. In the document's Executive Summary, the chairman of the planning committee remarked that:

> [a] repeated thesis for the last 10 to 20 years has been that advanced wastewater treatment provides a water of such high quality that it should not be discharged but put to further use. This thesis when joined to increasing problems of water shortage, provides a realistic atmosphere for considering the reuse of wastewater. However, at this time, there is no way to determine the acceptability of renovated wastewater for potable purposes.

The committee, at the time, recognized the potential for potable water reuse; but there were technical limitations and knowledge gaps that did not allow the group to fully understand the potential public health impacts of the practice.

Since then, communities with severe drought conditions have implemented direct potable reuse ("DPR"), including Big Spring, Tex. (2013) and Wichita Falls, Tex. (2014). In these locations, DPR was either the most cost effective or the only feasible solution to water resource challenges.

Around the world, there are a number of facilities that are currently operating successful potable reuse processes. The most notable project employing DPR is the Goreangab Water Reclamation Plant in Windhoek, Namibia. Windhoek was the first city to implement long-term potable reuse without the use of an environmental buffer. Windhoek's experimental DPR project began in 1969 and was expanded in 2002 to 5.5 million gallons per day. The project supplies approximately fifty (50) percent of the city's potable water demand.

In Beaufort West, South Africa, a severe drought in 2010 resulted in the need for trucks to deliver water to more than 8,000 homes. The Beaufort West Water Reclamation Plant was commissioned in 2011 to provide up to 0.6 millions gallons of potable water per day.

Singapore's NEWater plants are some of the best known IPR systems in the world. Potable reuse can satisfy up to forty (40) percent of Singapore's water demand, and it has helped the city-state pursue water sustainability. The potable water produced is consistently noted for achieving drinking water standards, including EPA drinking water standards and World Health Organization guidelines.

Like the processes mentioned above, the present invention is a portable apparatus and method to generate potable water, but the present invention uses unique techniques on a smaller scale for remote locations.

BRIEF DESCRIPTION OF THE DRAWINGS

The accompanying drawings are provided for the purpose of illustration only and are not intended as a definition of the limits of the present invention. The drawings illustrate a preferred embodiment of the present invention, wherein:

FIG. 14 is an isometric view of a preferred embodiment of gas off tank 31.

FIG. 15 is a side view of a preferred embodiment of gas off tank 31.

FIG. 23 is a top view of a preferred embodiment of the reverse osmosis unit 87.

FIG. 24 is a side view of a preferred embodiment of the reverse osmosis unit 87.

FIG. 25 is an isometric view of a preferred embodiment of calcite tank 113.

FIG. 26 is a side, cutaway view of a preferred embodiment of calcite tank 113.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 1:
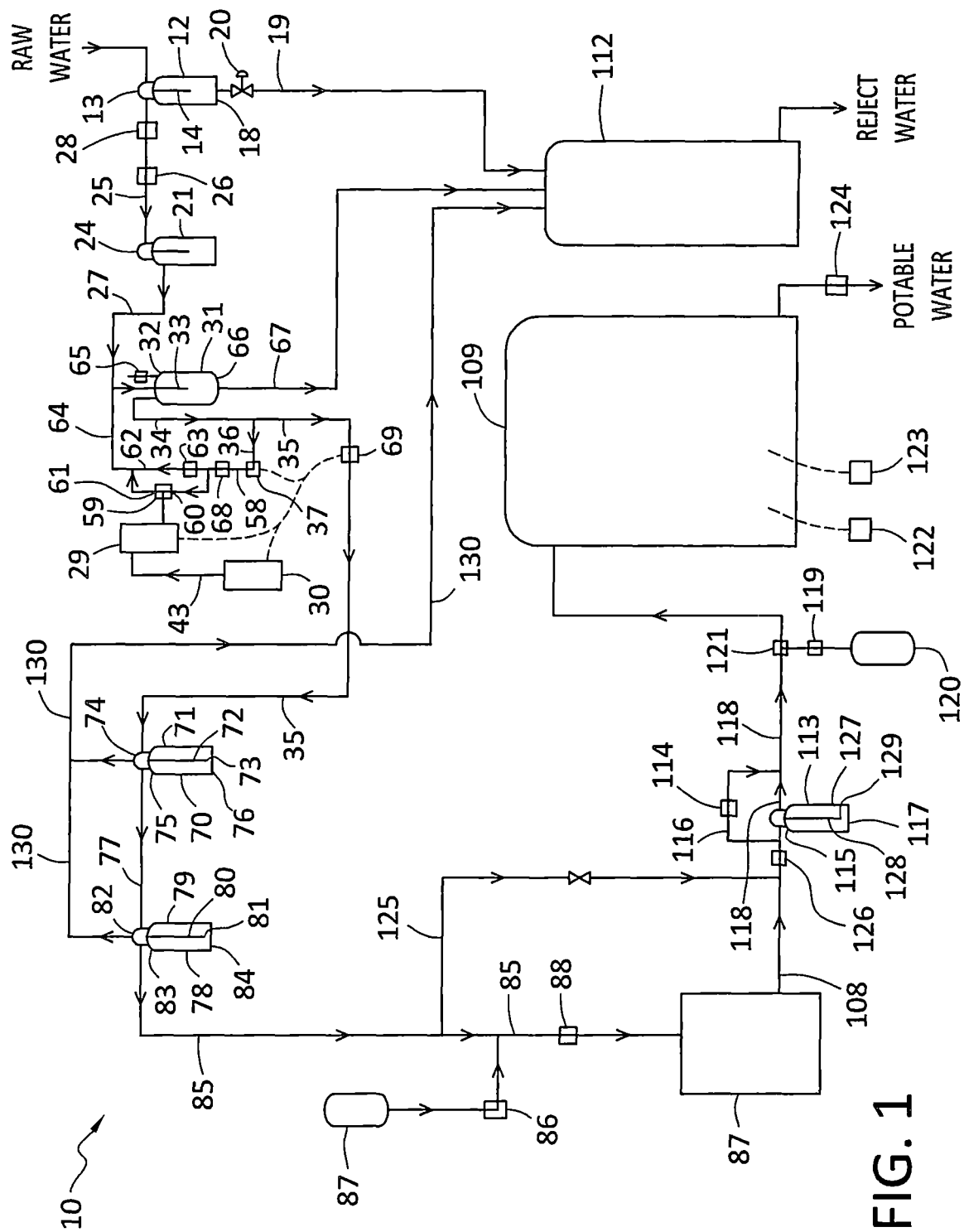
FIG. 1 is a flow diagram of a preferred embodiment of the present invention.
Figure 2:
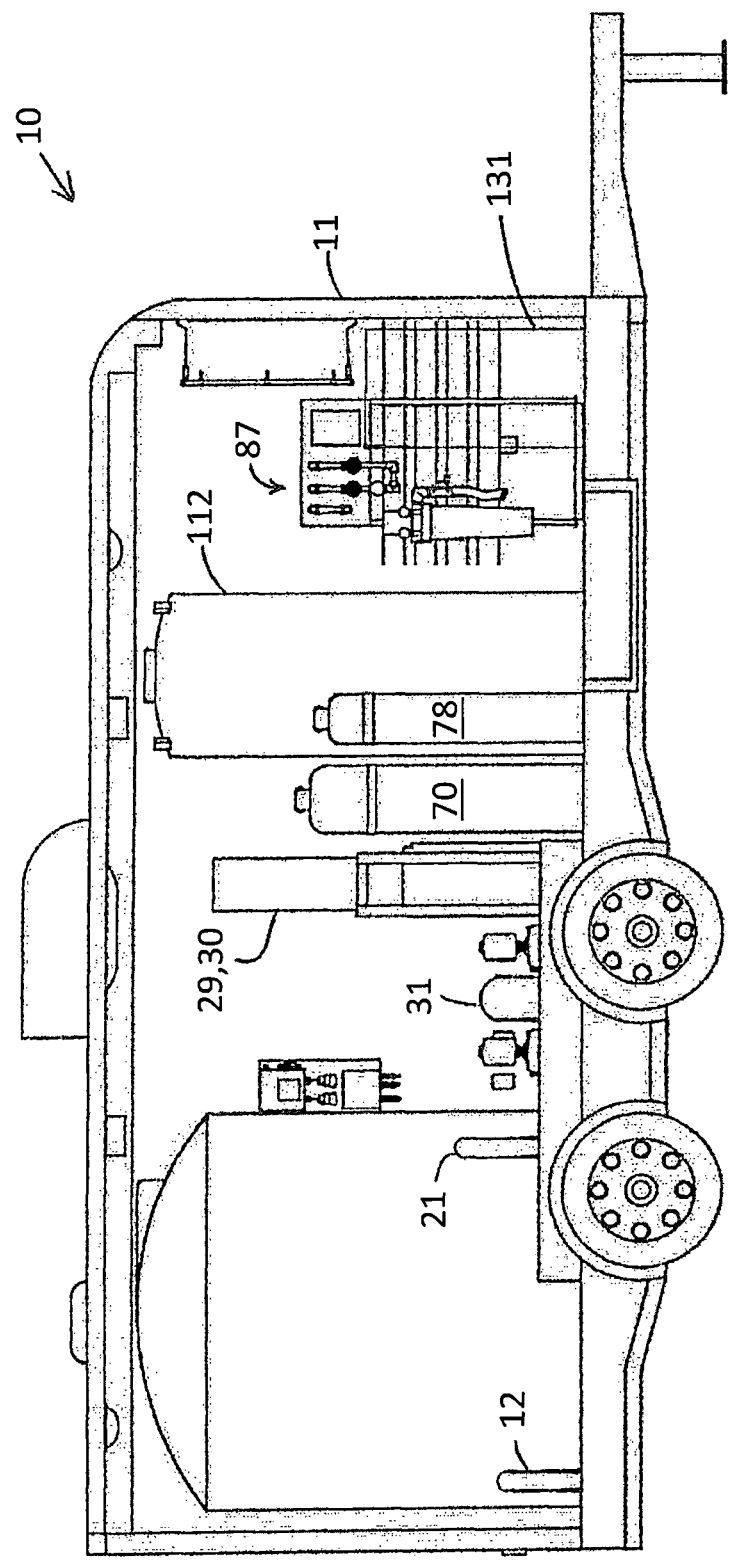
FIG. 2 is a side view of a preferred embodiment of the portable trailer housing the present invention.
Figure 3:
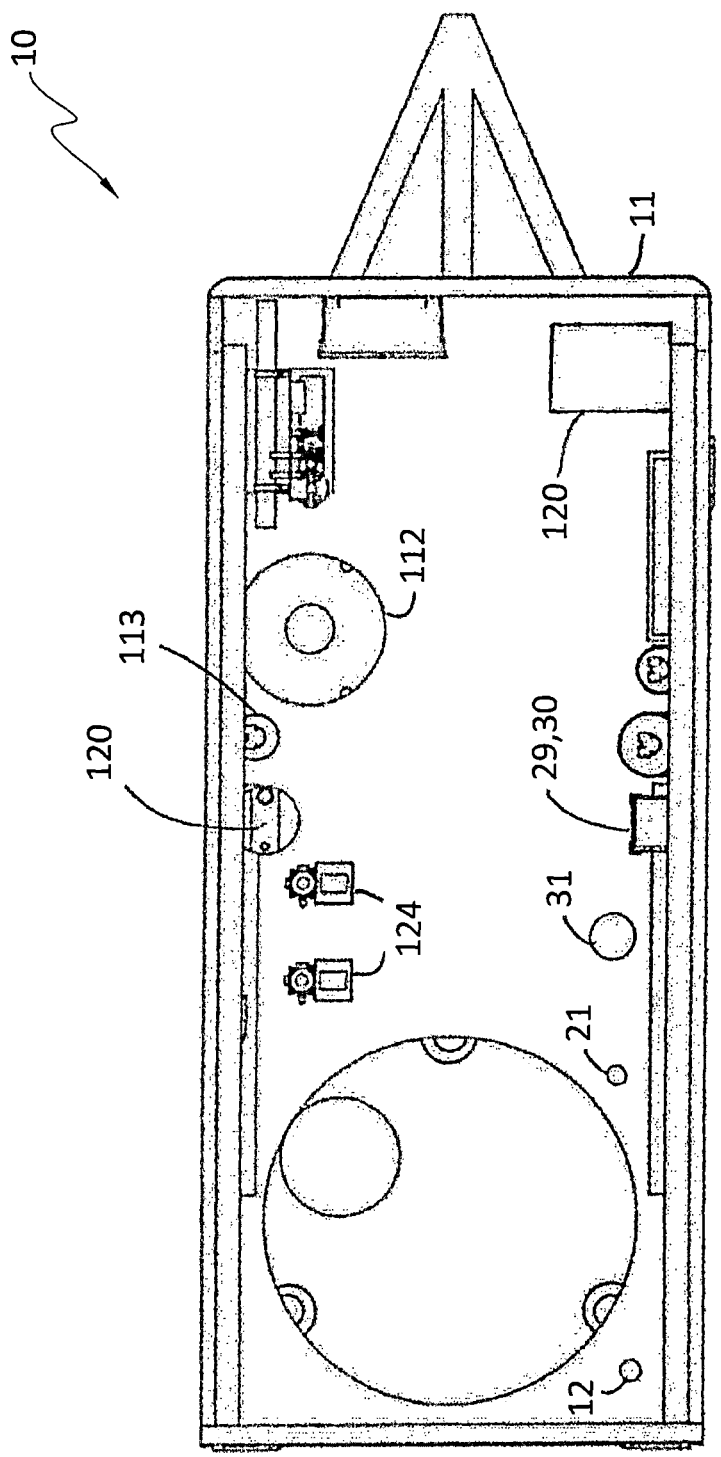
FIG. 3 is a top view of a preferred embodiment of the portable trailer housing the present invention.

The present invention is a portable, multi-stage system 10 that produces potable water in remote locations in a cost-effective and eco-friendly manner. A simplified diagram of the preferred embodiment of the present invention is shown in FIG. 1. The multi-stage system 10 of the present invention is preferably housed in a enclosed, portable trailer 11, as shown in FIGS. 2 and 3. All of the piping and tanks in multi-stage system 10 that come into contact with the process water or the potable water are preferably USDA food grade or NSF-61 rated.

Figure 5:
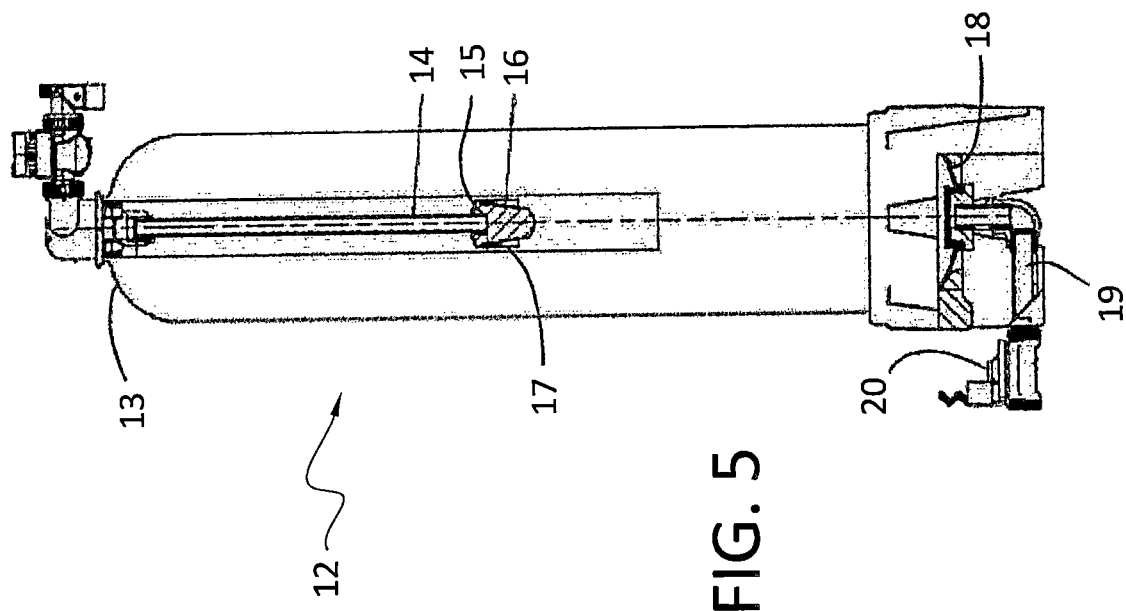
FIG. 5 is a side, cutaway view of a preferred embodiment of sediment knockout tank 12.
Figure 4:
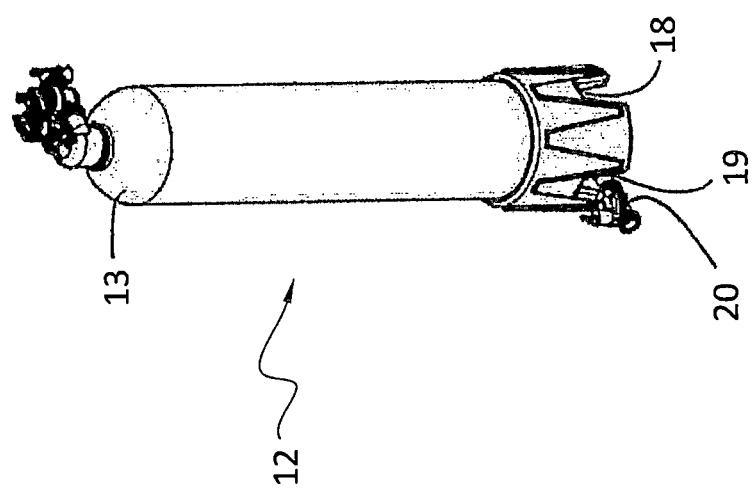
FIG. 4 is an isometric view of a preferred embodiment of sediment knockout tank 12.

Non-potable water is typically supplied to multi-stage system 10 using pumps (not shown). The first major step in the multi-step system 10 preferably involves removing sand, large sediments, and other particulates from the incoming non-potable water (the "process water"). As generally shown in FIG. 1, the first major step in the multi-step system 10 is preferably accomplished using a sediment knockout tank 12 that is designed to remove sand, large sediments, and other particulates from the process water to minimize or prevent clogging in the downstream steps of the multi-step system 10. FIGS. 4 and 5 show a preferred embodiment of the sediment knockout tank 12.

The process water preferably enters sediment knockout tank 12 at the top 13 and flows into sediment knockout tank 12 through a riser tube 14 that extends into sediment knockout tank 12, as shown in FIG. 5. Riser tube 14 has a bottom 15 that is preferably equipped with a basket 16 with a deflector cup 17. As, the process water enters sediment knockout tank 12 through riser tube 14, gravity separates the sand, large sediments, and other particulates having a higher density than the process water, and the sand, large sediments, and other particulates settle to the bottom 18 of sediment knockout tank 12. The clarified process water exits the top 13 of sediment knockout tank 12 and then flows through process line 25 (shown in FIG. 1) to the next step in multi-step system 10. The sand, large sediments, and other particulates that have settled to the bottom 18 of sediment knockout tank 12 are periodically removed through a waste line 19 at the bottom 18 of sediment knockout tank 12, as shown in FIG. 5. Waste line 19 is preferably equipped with an automatic valve 20 that automatically opens for a short period of time at desired intervals, depending on the amount of sand, large sediments, and other particulates being introduced into sediment knockout tank 12 with the incoming process water. The sand, large sediment, and other particulates removed through waste line 19 are sent to reject tank 112, as shown in FIG. 1.

An alternative process of removing sand, large sediments, and other particulates employs cyclone action in a sediment removal tank (not shown). The cyclone action is accomplished by tangentially introducing the process water into the upper chamber of the sediment removal tank. As the process water enters the sediment removal tank, centrifugal forces and gravity separate the sand, large sediments, and other particulates having a higher density than the process water, and the sand, large sediments, and other particulates settle to the bottom of the sediment removal tank. The clarified process water exits the sediment removal tank through a riser tube near the top of the sediment removal tank. The clarified process water is then sent to the next step in the multi-step system 10. The sand, large sediments, and other particulates at the bottom of the sediment removal tank are periodically removed through a waste line at the bottom of the sediment removal tank.

Figure 7:
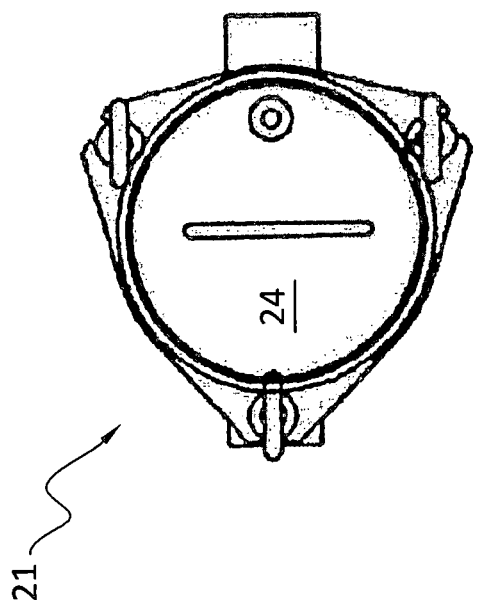
FIG. 7 is a top view of a preferred embodiment of oil filter tank 21.
Figure 6:
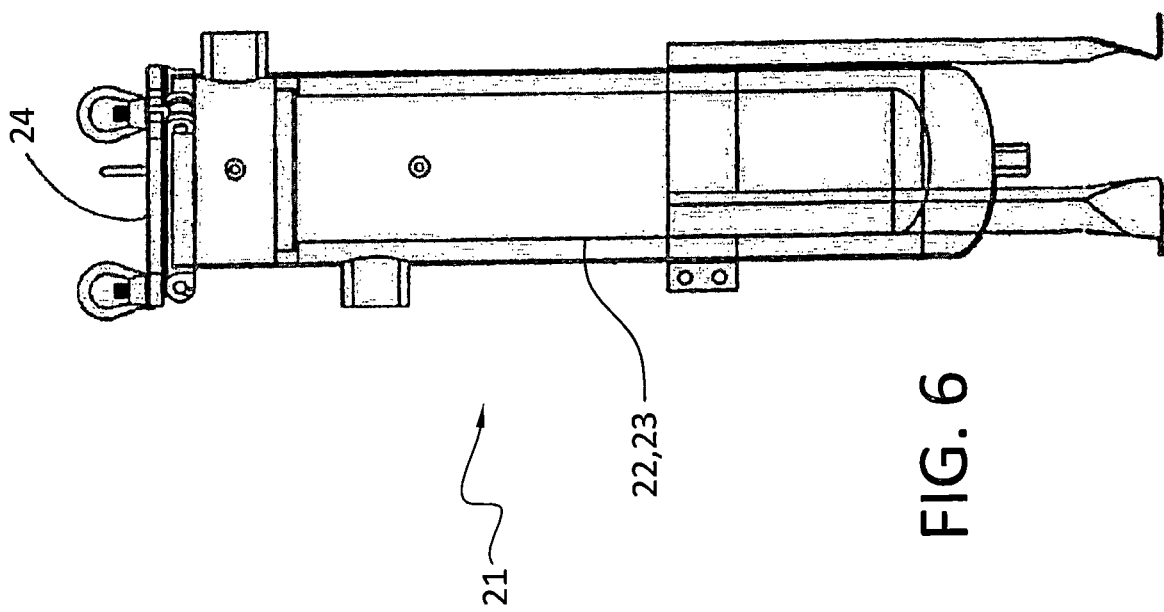
FIG. 6 is a side, cutaway view of a preferred embodiment of oil filter tank 21.

As generally shown in FIG. 1, the second major step of multi-step system 10 preferably involves the removal of oil from the process water exiting the top 13 of sediment knockout tank 12 through process line 25. The second major step is preferably accomplished using an oil filter tank 21. FIGS. 6 and 7 show a preferred embodiment of the oil filter tank 21.

Oil filter tank 21 is preferably equipped with an oil absorbing filter bag 22 that fits inside a filter bag basket 23. The process water flowing from the sediment knockout tank 12 through process line 25 enters the oil filter tank 21 near the top 24 of oil filter tank 21. Once inside oil filter tank 21, the process water flows through filter bag 22, which is preferably made from polypropylene micro-fibers and other oil retaining fibers designed to remove at least 97% of the oil from the process water. The process water exiting filter bag 22 and filter bag basket 23 flows out of oil filter tank 21 through process line 27 to the next step in the multi-step system 10. The oil collected in the oil absorbing filter bag 22 can be periodically removed from the oil filter tank 21 by draining the oil filter tank 21 and then removing and replacing the oil absorbing filter bag 22. In the alternative, the oil collected in the oil absorbing filter bag 22 can be periodically removed from the oil filter tank 21 by draining the oil filter tank 21, removing and cleaning the oil absorbing filter bag 22, and then re-installing the cleaned oil absorbing filter bag 22 in oil filter tank 21.

In the preferred embodiment, a flow meter 26 can be placed in the process line 25 between the sediment knockout tank 12 and the oil filter tank 21, as shown in FIG. 1. Flow meter 26 can be used to measure the flow rate of the process water flowing from the sediment knockout tank 12 and the oil filter tank 21. In addition, a pressure sensor 28 can be placed in the process line 25 between the sediment knockout tank 12 and the oil filter tank 21, as shown in FIG. 1.

Pressure sensor 28 can be used to measure the pressure in the process line 25 between the sediment knockout tank 12 and the oil filter tank 21.

As generally shown in FIG. 1, the third major step of multi-step system 10 involves the mixing of ozone into the process water. Ozone is the most effective and rapidly acting primary disinfectant available for treating water. Ozone has a superior ability to kill viruses, bacteria, algae, and biological contaminants found in water, with a kill ratio of 99.9% on many harmful viruses and bacteria. Ozone is also a strong oxidant that can oxidize metals such as manganese, iron, and sulfur into insoluble particles, aiding in their filtration and removal from water. Ozone is also much more efficient than chlorine at removing taste and odor problems from water, and the ozone itself does not produce any odor or taste in the water.

Ozone is created by adding a third oxygen atom to a stable oxygen molecule ($O_2$), resulting in an unstable gas made up of three atoms of oxygen ($O_3$). Because ozone ($O_3$) is an unstable gas that decomposes to diatomic oxygen ($O_2$) very rapidly (either by attacking impurities or through normal degradation), it requires on-site generation. Therefore, the third major step of the multi-step system 10 preferably utilizes an ozone generator 29 to generate ozone ($O_3$) and immediately introduce it into the process water. The ozone generator 29 preferably produces ozone by passing highly concentrated diatomic oxygen ($O_2$) through a high voltage electrical field or corona. The oxygen atoms in the diatomic oxygen ($O_2$) are split in the high voltage electrical field or corona, freeing oxygen atoms ($O_1$) to rapidly collide with the diatomic oxygen ($O_2$) to form ozone ($O_3$).

Figure 9:
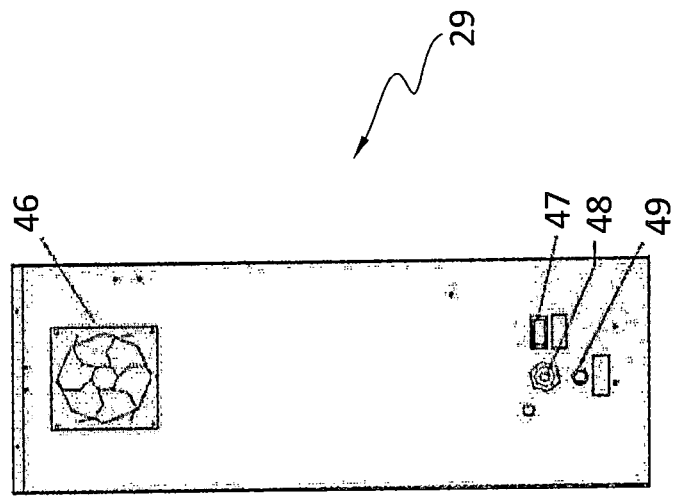
FIG. 9 is a side view of a preferred embodiment of ozone generator 29.
Figure 8:
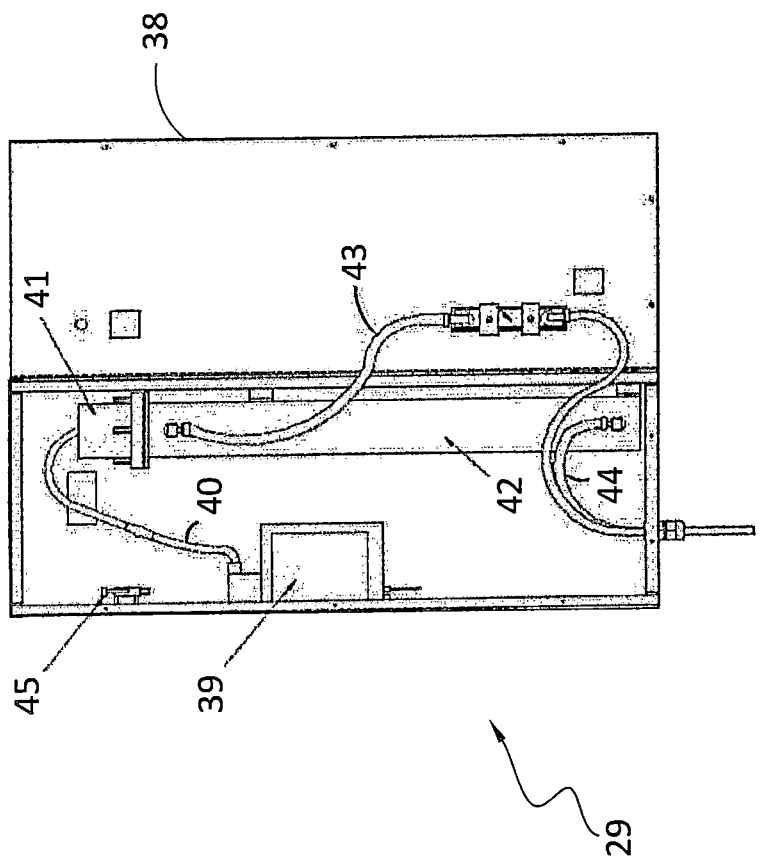
FIG. 8 is a front view of a preferred embodiment of ozone generator 29 (with cabinet door open).
Figure 10:
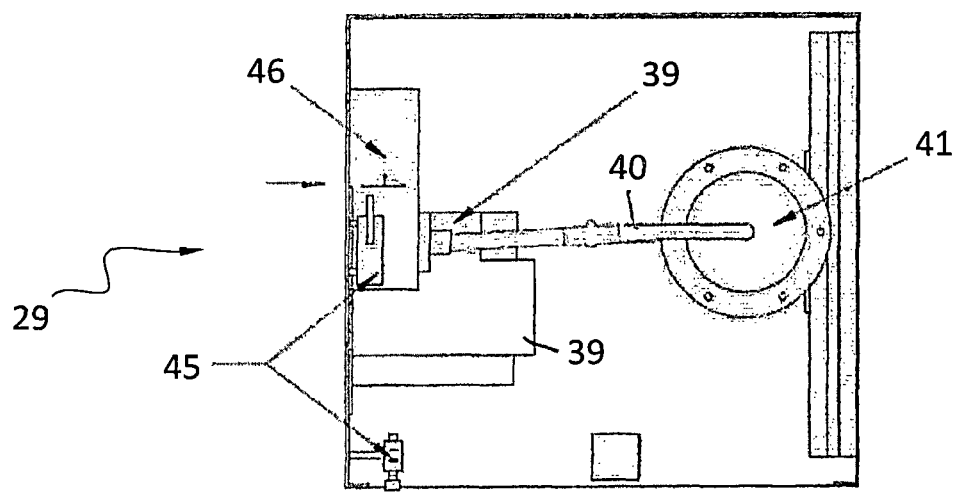
FIG. 10 is a top view of a preferred embodiment of ozone generator 29.
Figure 11:
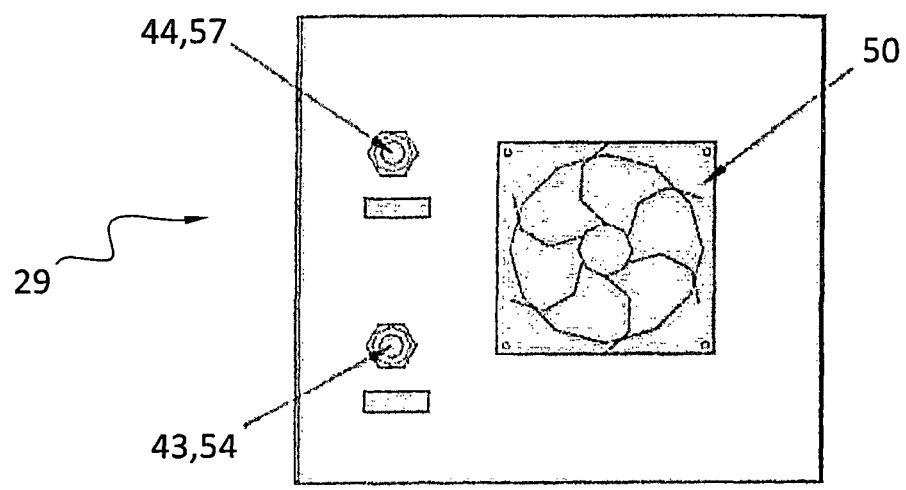
FIG. 11 is a bottom view of a preferred embodiment of ozone generator 29.
Figure 12:
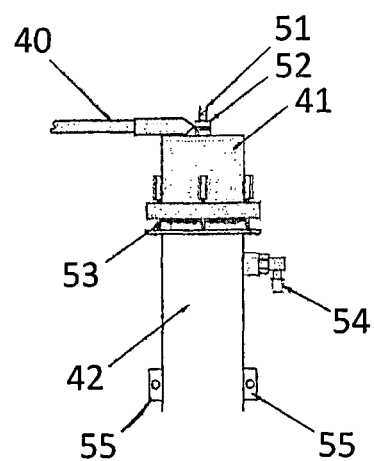
FIG. 12 close-up view of a preferred embodiment of the corona discharge cell interface.
Figure 13:
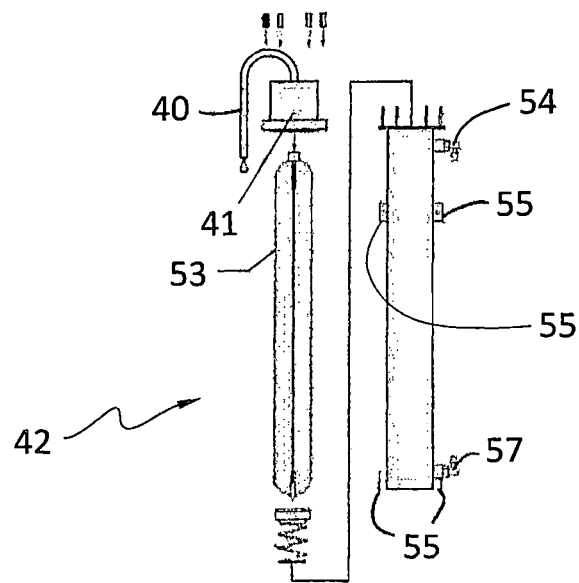
FIG. 13 is an exploded view of a preferred embodiment of corona discharge cell 53.

A preferred embodiment of the ozone generator is shown in FIGS. 8 through 13. FIG. 8 is a front view of ozone generator 29 with the front panel door 39 open, showing a high voltage transformer 39, a high voltage wire 40, a high voltage cap assembly 41, a corona discharge cell manifold assembly 42, an oxygen inlet line 43, an ozone outlet line 44, and a safety interlock switch 45. FIG. 9 is a left side view of ozone generator 29 showing a cooling fan and intake filter 46, an on/off switch 47, an AC power cord 48, and a fuse 49. FIG. 10 is a top view of ozone generator 29 showing a high voltage transformer 39, high voltage wire 40, high voltage cap assembly 41, and safety interlock switch 45. FIG. 11 is a bottom view of ozone generator 29 showing oxygen inlet line 43, ozone outlet line 44, and a cooling exhaust fan 50. FIG. 12 is a close-up view of high voltage cap assembly 41, showing high voltage wire 40, corona discharge cell manifold assembly 42, a high voltage post 51, a hold down nut 52 for the high voltage cap assembly 41, a corona discharge cell 53, an oxygen inlet fitting 54, corona discharge cell manifold assembly 42, and manifold assembly mounting feet 55. FIG. 13 is an exploded view of corona discharge cell manifold assembly 42, showing high voltage wire 4U, high voltage cap assembly 41, corona discharge cell manifold 56, corona discharge cell 53, oxygen inlet fitting 54, manifold assembly mounting feet 55, and an ozone outlet fitting 57.

In the present invention, the highly concentrated diatomic oxygen ($O_2$) is preferably provided to the ozone generator 29 by an oxygen concentrator 30, as generally shown in FIG. 1. Oxygen concentrator 30 is preferably designed to provide 95 to 100 pure oxygen ($O_2$) to the ozone generator 29 through oxygen inlet line 43, shown in FIG. 8. Oxygen concentrator 30 preferably concentrates the oxygen from ambient air by selectively removing nitrogen to supply an oxygen-enriched gas stream to the ozone generator 29.

In addition to the ozone generator 29 and the oxygen concentrator 30, the third major step of multi-step system 10 preferably utilizes a gas off tank 31. A preferred embodiment of gas off tank 31 is shown in FIGS. 14 and 15.

The process water flowing out of oil filter tank 21 through process line 27, as shown in FIG. 1, preferably enters the top 32 of gas off tank 31, as shown in FIGS. 14 and 15, and flows into gas off tank 31 through a riser tube 33 (shown in FIG. 1). During normal operation, the gas off tank 31 fills up with process water, at which point the process water exits the top 32 of gas off tank 31 through process line 34. As shown in FIG. 1, a portion of the process water exiting the top 32 of gas off tank 31 through process line 34 continues flowing through process line 35 to the fourth major step of multi-step system 10, as discussed in more detail below. As shown in FIG. 1, the balance of the process water exiting the top 32 of gas off tank 31 through process line 34 continues flowing through process line 36 to circulating pump 37. The process water entering circulating pump 37 is pumped into process line 58 on the discharge side of circulating pump 37. A pressure sensor 68 can be placed in process line 58 to monitor the discharge pressure of circulating pump 37.

A portion of the process water flowing through process line 58 continues flowing through a venturi injector 59, which is designed to introduce ozone ($O_3$) from the ozone generator 29 into the process water. Although many types of devices can be used to introduce ozone ($O_3$) into the process water, the preferred device is a venturi injector 59. A venturi injector 59 creates very small bubbles and violent mixing for exceptional mass transfer of the ozone gas into the process water. The present invention preferably provides approximately four to five minutes of contact time between the ozone ($O_3$) and the process water for every gallon per minute of process water flowing through gas off tank 31.

For venturi injector 59 to work properly, there must be a pressure differential between the inlet 60 and outlet 61 of venturi injector 59. The pressure differential is created by circulating pump 37 and the pressure differential is preferably controlled by directing a portion of the process water flowing through process line 58 to a bypass line 62, which is equipped with a bypass valve 63, as shown in FIG. 1. Bypass valve 63 is adjusted to increase or decrease the flow rate of process water through bypass line 62, which decreases or increases, respectively, the pressure differential between the inlet 60 and outlet 61 of venturi injector 59 to a desired level.

Because the venturi injector 59 introduces oxygen and ozone into the process water, the multi-step system 10 preferably has a step for removing the un-dissolved oxygen and ozone in the process water. As shown in FIG. 1, the process water exiting the venturi injector 59 is rejoined with the process water exiting bypass line 62 and is directed through process line 64 to process line 27 where it enters the top 32 of gas off tank 31 and flows into gas off tank 31 through a riser tube 33 (shown in FIG. 1). The un-dissolved oxygen and ozone in the process water entering gas off tank 31 escapes from gas off tank 31 through a gas off valve 65 connected to the top of gas off tank 31, as shown in FIG. 15.

In addition to removing undissolved oxygen and ozone in the process water, the gas off tank 31 removes any solids in the process water entering the gas off tank 31. Any solids collected at the bottom 66 of gas off tank 31 can be periodically removed through a drain line 67 and sent to reject tank 112, as shown in FIGS. 1, 14, and 15.

As mentioned above, a portion of the process water exiting the top 32 of gas off tank 31 through process line 34 preferably continues flowing through process line 35 to the fourth major step of multi-step system 10. A flow sensor/switch 69 can be installed in process line 35 to monitor whether process water is flowing through process line 35. If process water is flowing through process line 35, then flow sensor/switch 69 can activate ozone generator 29, oxygen concentrator 30, and circulating pump 37 to add ozone ($O_3$) to the process water, as discussed above. If process water is not flowing through process line 35, then flow sensor/switch 69 can deactivate ozone generator 29, oxygen concentrator 30, and circulating pump 37.

As generally shown in FIG. 1, the fourth major step of multi-step system 10 involves further filtration of the process water flowing from the gas off tank 31 through process line 35. The fourth major step is preferably accomplished using a series of filtration tanks. The present invention preferably includes two filtration tanks in the fourth major step, including filtration tank 70 and filtration tank 78.

Figure 17:
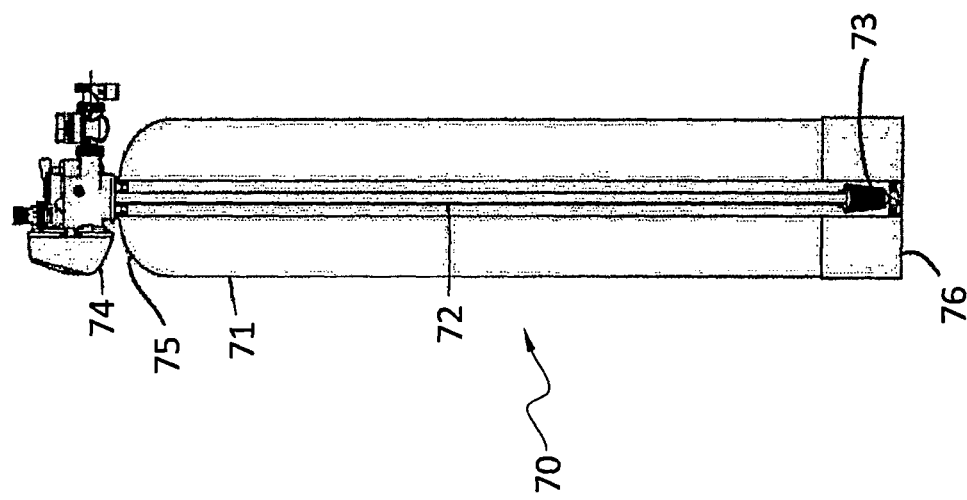
FIG. 17 is a side, cutaway view of a preferred embodiment of filtration tank 70.
Figure 16:
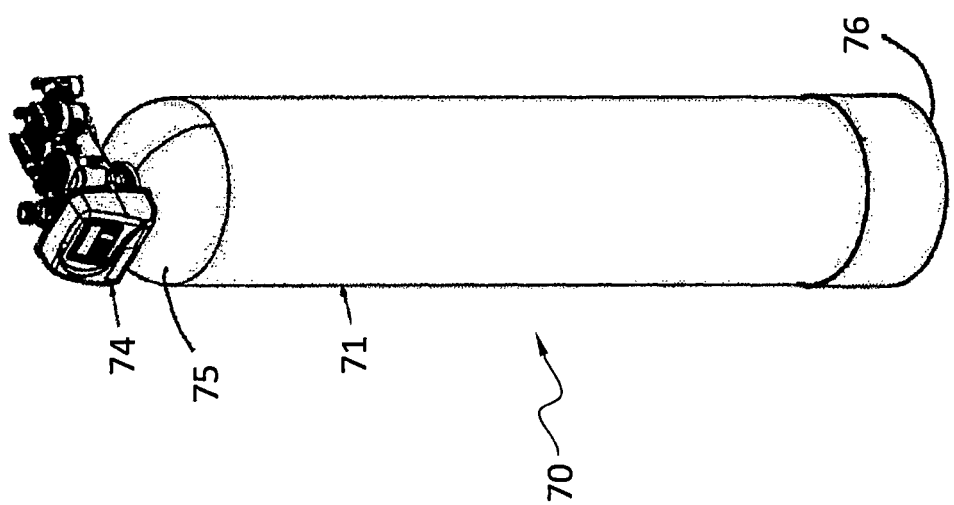
FIG. 16 is an isometric view of a preferred embodiment of filtration tank 70.

A preferred embodiment of filtration tank 70 is shown in FIGS. 16 and 17. Filtration tank 70 preferably has an outer shell 71, a riser tube 72 with a bell nozzle 73, and an automatic backwashing valve assembly 74. Filtration tank 70 preferably contains catalytic filtration media for removing oxidized iron, hydrogen sulfide, manganese, and other metals and particulate matter from the process water. The preferred filtration media is called "Filox," which is the purest available manganese oxide in the industry. Filox is significantly heavier than other iron removal media (about 114 pounds per cubic foot). Accordingly, Filox requires a more frequent backwash and higher backwash flow rates.

Because of the necessity to backwash the Filox filtration media, filtration tank 70 is preferably equipped with an automatic backwashing valve assembly 74. The automatic backwashing valve assembly 74 preferably employs a micro-switch (not shown) that shuts down the flow of the process water in multi-step system 10 whenever filtration tank 70 is in backwash mode. The primary purpose of the micro-switch is to prevent non-filtered process water from reaching the reverse osmosis process (discussed below) when filtration tank 70 is in backwash mode.

During normal operation of filtration tank 70, the process water flowing from the gas off tank 31 through process line 35 preferably enters filtration tank 70 at the top 75 of filtration tank 70 through automatic backwashing valve assembly 74. Once the process water enters the filtration tank 70, the process water flows to the bottom 76 of filtration tank 70 through riser tube 72 and bell nozzle 73. After exiting bell nozzle 73, the process water flows upwardly through the Filox filtration media inside filtration tank 70. The process water exits filtration tank 70 through automatic backwashing valve assembly 74 and flows to the next step in the multi-step system 10 through process line 77, as shown in FIG. 1. During the backwash mode, backwash is discharged from filtration tank 70 through backwashing valve assembly 74 and process line 130 and is sent to reject tank 112, as shown in FIG. 1.

Figure 19:
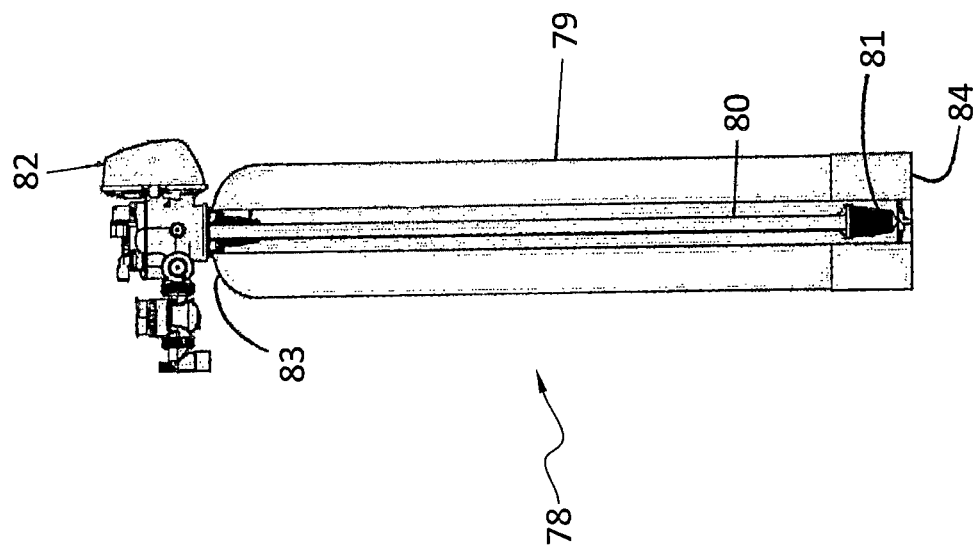
FIG. 19 is a side, cutaway view of a preferred embodiment of filtration tank 78.
Figure 18:
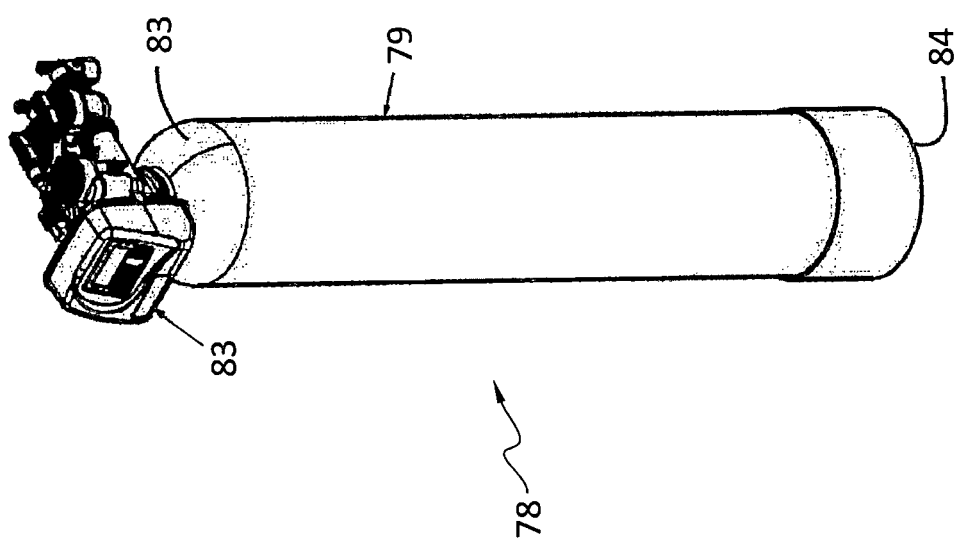
FIG. 18 is an isometric view of a preferred embodiment of filtration tank 78.

A preferred embodiment of filtration tank 78 is shown in FIGS. 18 and 19. Like filtration tank 70, filtration tank 78 preferably has an outer shell 79, a riser tube 80 with a bell nozzle 81, and an automatic backwashing valve assembly 82. Filtration tank 78 preferably contains carbon filtration media for removing a wide range of chemicals, sediments, and suspended minerals from the process water. The carbon filtration media also reduces odor in the process water and destructs any residual ozone in the process water. Like the Filox filtration media in filtration tank 70, the carbon filtration media in filtration tank 78 requires backwashing.

Because of the necessity to backwash the carbon filtration media, filtration tank 78 is preferably equipped with an automatic backwashing valve assembly 82. The automatic backwashing valve assembly 82 preferably employs a micro-switch (not shown) that shuts down the flow of the process water in multi-step system 10 whenever filtration tank 78 is in backwash mode. The primary purpose of the micro-switch is to prevent non-filtered process water from reaching the reverse osmosis process (discussed below) when filtration tank 78 is in backwash mode.

During normal operation of filtration tank 78, the process water flowing from filtration tank 70 through process line 77 preferably enters filtration tank 78 at the top 83 of filtration tank 78 through automatic backwashing valve assembly 82. Once the process water enters the filtration tank 78, the process water flows to the bottom 84 of filtration tank 78 through riser tube 80 and bell nozzle 81. After exiting bell nozzle 81, the process water flows upwardly through the carbon filtration media inside filtration tank 78. The process water exits filtration tank 78 through automatic backwashing valve assembly 82 and flows to the next step in the multi-step system 10 through process line 85, as shown in FIG. 1. During the backwash mode, backwash is discharged from filtration tank 78 through backwashing valve assembly 82 and process line 130 and is sent to reject tank 112, as shown in FIG. 1.

As generally shown in FIG. 1, the fifth major step of multi-step system 10 preferably introduces an anti-scalant/dispersant into the process water to control calcium carbonate, calcium sulfate, barium sulfate, calcium fluoride, silica, and hydroxide of iron and aluminum before the process water reaches the reverse osmosis process (discussed below). The anti-scalant/dispersant is preferably introduced to the process water by using a pump 86 to pump anti-scalant/dispersant from a tank 87 into the process water flowing through process line 85 from filtration tank 78. The target concentration of the anti-scalant/dispersant in the process water is approximately five (5) ppm. In the preferred embodiment of the present invention, the anti-scalant/dispersant is injected into the process water only when the reverse osmosis process (discussed below) is operating.

As generally shown in HU. 1, the sixth major step of multi-step system 10 preferably uses reverse osmosis to further purify the process water. Reverse osmosis ("RO") is a special type of filtration that uses pressure to pass water through a semi-permeable, thin membrane with pores small enough to pass pure water through while rejecting larger molecules such as dissolved salts (sodium, potassium, chloride, etc.) and other impurities such as bacteria, phosphates, nitrates, arsenic, and lead, to name a few. RO works by reversing the principle of osmosis, the natural tendency of water with dissolved salts to flow through a membrane from lower to higher salt concentration.

In a typical RO system, pressure (usually from a pump) is used to overcome natural osmotic pressure, forcing feedwater with its load of dissolved salts and other impurities through a highly sophisticated semipermeable membrane that removes a high percentage of the impurities. The product of this process is highly purified water. The dissolved salts and other impurities that do not make it through the membrane become part of a concentrated reject stream.

A representative example of the preferred RO unit 87 in the present invention is the Watts Water Technologies R-14 unit, shown in FIGS. 20 through 24. RO unit 87 is a commercial grade high-pressure RO unit designed to supply high quality water with production rates ranging from 3,600 to 10,800 gallons per day. RO unit 87 uses high-pressure/high-rejection membranes to achieve a minimum average NaCl ionic rejection of 95-98 percent. In the present invention, RO unit 87 preferably uses four membranes, but is expandable to more than four membranes.

The process water flowing from filtration tank 78 through process line 85 can be fed to the RO unit 87 or it can be directed past the RO unit 87 through bypass line 125. Before the process water flowing from filtration tank 78 through process line 85 is fed into RO unit 87, the process water is preferably measured for totaled dissolved solids ("TDS") using a TDS sensor 88 installed in process line 85 between filtration tank 78 and RO unit 87. The TDS sensor 88 is preferably designed to measure the dissolved combined content of all inorganic and organic substances present in the process water in molecular, ionized, or micro-granular (colloidal sol) suspended form. This measurement is compared to the TDS measurement of the process water exiting the RO unit 87, as discussed below, to monitor the performance of the RO unit 87.

The RO unit 87 is preferably controlled using a controller 89, as shown in FIGS. 20, 21, 22, and 24. Controller 89 is designed to control the operation of the RO unit 87 and display the product water quality of the process water flowing through the RO unit 87.

Figure 21:
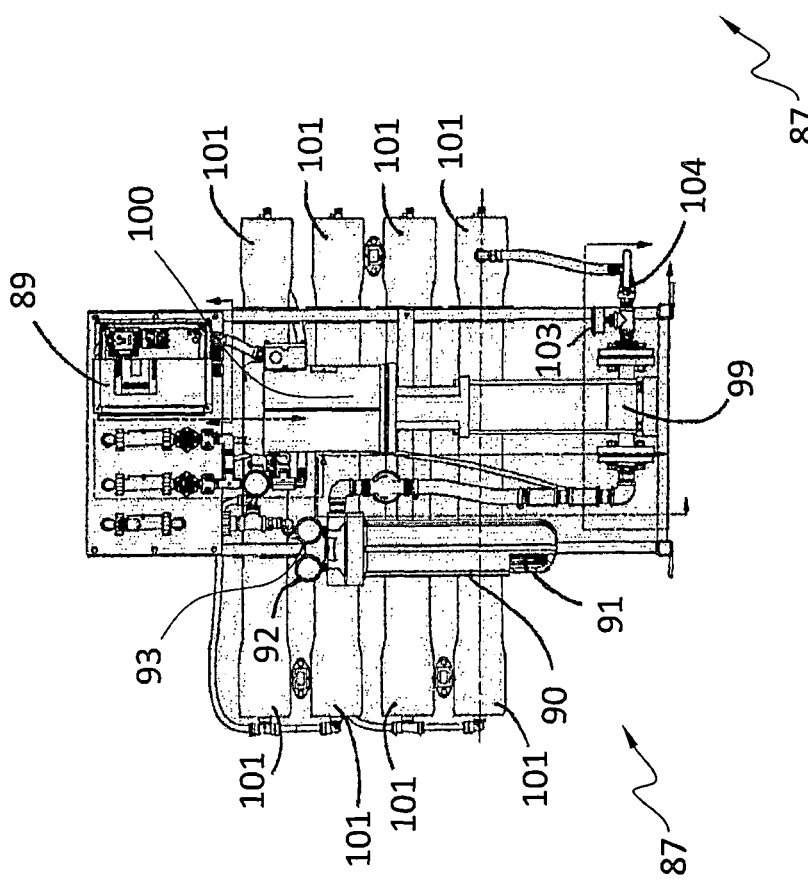
FIG. 21 is a front view of a preferred embodiment of the reverse osmosis unit 87.

As mentioned above, the process water is preferably fed to the RO unit 87 through process line 85 from filtration tank 78. From process line 85, the process water enters a prefilter housing 90, which contains an RO prefilter 91, as shown in FIG. 21. The prefilter housing 90 is preferably equipped with an inlet pressure gauge 92 and an outlet pressure gauge 93 to determine the differential pressure between the inlet 94 and outlet 95 of prefilter housing 89 to signal when the RO prefilter 91 needs cleaning or replacing.

The process water exits prefilter housing 89 through process line 96. An automatic inlet valve 97 is preferably installed in process line 96. Automatic inlet valve 97 is designed to automatically open when the amount of produced process water in product tank 109 needs to be replenished. Automatic inlet valve 97 is designed to automatically close when a desired amount of produced process water is available in product tank 109.

In addition to the automatic inlet valve 97, a pressure sensor/switch 98 is preferably installed in process line 96 to monitor the pressure of the process water in process line 96. Pressure sensor/switch 98 sends a signal to controller 89 when the pressure of the process water in process line 96 falls below a predetermined pressure. In the present invention, the predetermined pressure is 10 psig. When controller 89 receives the signal from pressure sensor/switch 98 that the pressure of the process water in process line 96 has fallen below 10 psig, then controller 89 sends a signal to close automatic inlet valve 97 and shut down high-pressure pump 99.

Figure 20:
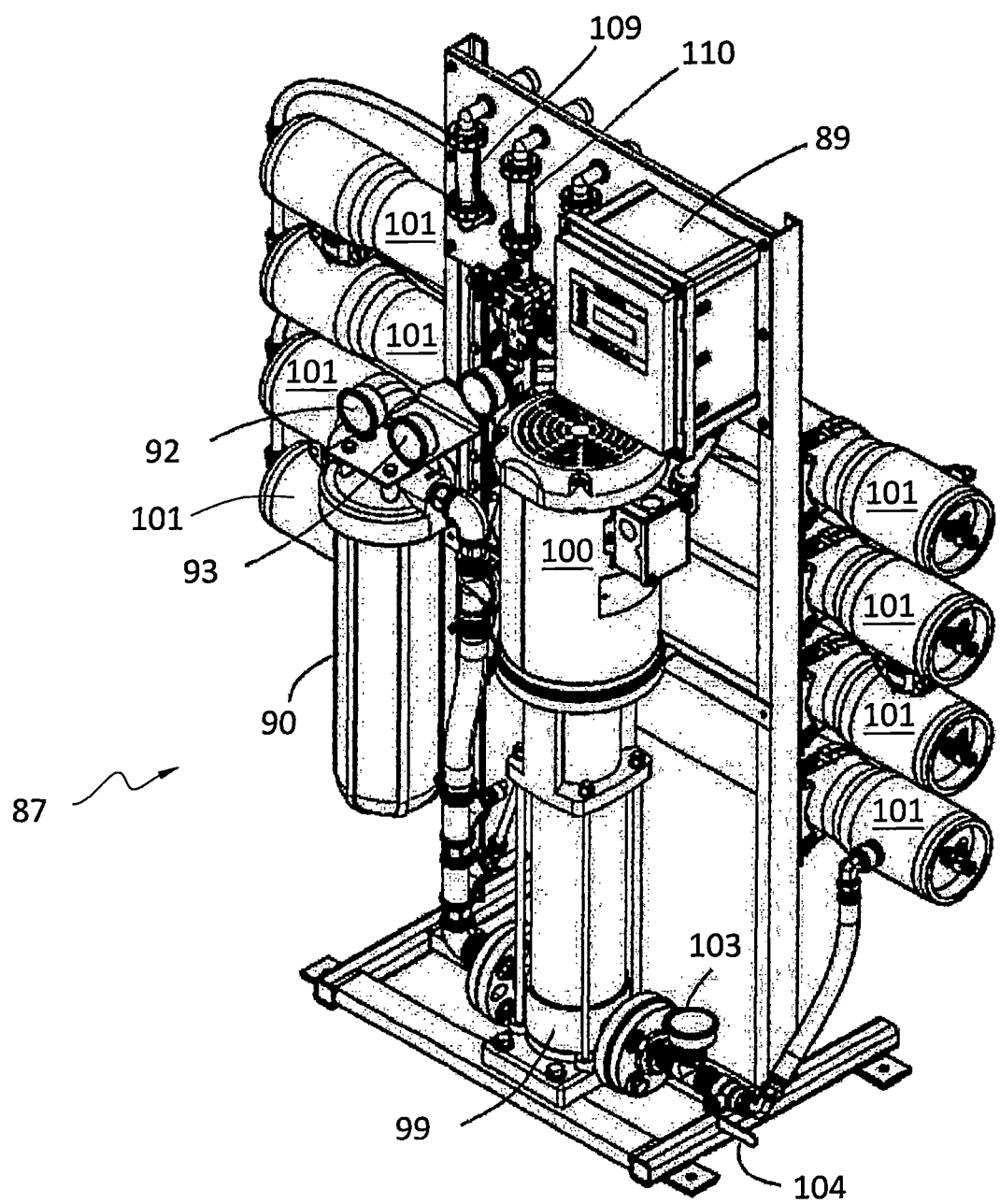
FIG. 20 is an isometric view of a preferred embodiment of the reverse osmosis unit 87.
Figure 22:
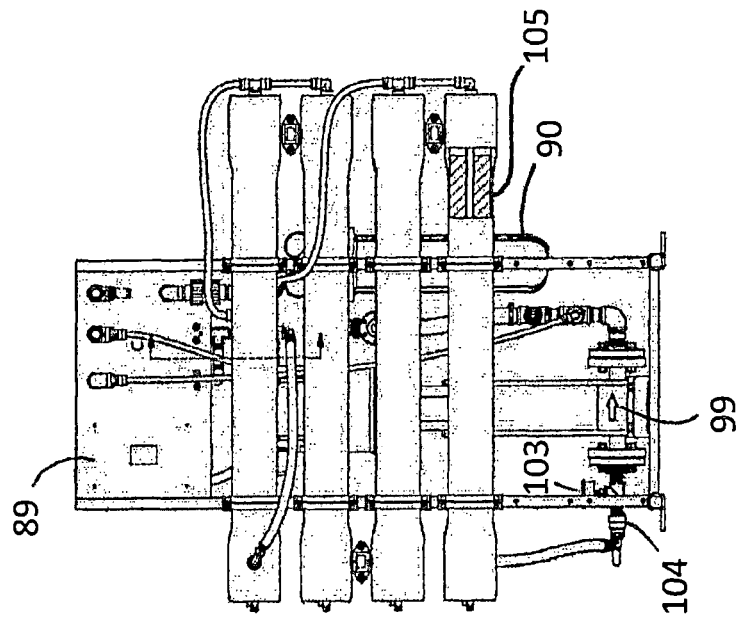
FIG. 22 is a back view of a preferred embodiment of the reverse osmosis unit 87.

The process water flows from prefilter housing 90 through process line 96 to high-pressure pump 99, as shown in FIGS. 20, 21, and 22. High-pressure pump 99 is preferably powered by an electric motor 100. High-pressure pump 99 increases the pressure of the process water before it enters the series of RO membrane vessels 101. The process water exits high-pressure pump 99 through process line 102. A pressure gauge 103 can be installed in process line 102 to monitor the discharge pressure of high-pressure pump 99. In addition, a pump discharge valve 104 can be installed in process line 102 to control the rate of flow of the process water exiting high-pressure pump 99.

The process water flows from high-pressure pump 99 through process line 102 to a series of RO membrane vessels 101, as shown in FIGS. 21 through 24. Each RO membrane vessel contains an RO membrane 105, shown in FIG. 22, designed to remove dissolved salts (sodium, potassium, chloride, etc.) and other impurities such as bacteria, phosphates, nitrates, arsenic, and lead, to name a few, from the process water.

The process water flows from the series of RO membrane vessels 101 through process line 106 to one of three flow meters that measure the flow rate of the process water flowing through the RO unit 87.

The first flow meter is the product flow meter 107, which measures the flow rate of produced process water exiting the RO unit 87. The produced process water flows through process line 108 into the product tank 109. The process water flowing from the series of RO membrane vessels 101 is directed to the product flow meter 107 when the quality of the process water flowing from the series of RO membrane vessels 101 satisfies the quality standards for the process water in product tank 109. One of the factors in determining the quality of the process water flowing from the series of RO membrane vessels 101 is the measure of TDS in the process water flowing from the series of RO membrane vessels 101. To make this measurement, a TDS sensor 126 is preferably installed in process line 108 between the RO unit 87 and the calcite tank 113 (discussed below). The TDS sensor 126 is preferably designed to measure the dissolved combined content of all inorganic and organic substances present in the process water in molecular, ionized, or micro-granular (colloidal sol) suspended form. This measurement is not only used as a factor in determining whether to direct the process water flowing from the RO membrane vessels 101 to the product flow meter 107, but it is also used to compare the TDS measurement of the process water entering the RO unit 87, as discussed above in the context of TDS sensor 88, to monitor the performance of the RU unit 87.

The second flow meter is the reject flow meter 110, which measures the flow rate of rejected process water exiting the RO unit 87. The rejected process water can flow through process line 111 into the reject tank 112 when the quality of the process water flowing from the series of RO membrane vessels 101 does not satisfy the quality standards for the process water in product tank 109.

The third flow meter is the reject recycle flow meter 113, which measures the flow rate of process water recycled through the RO unit 87. The rejected recycle process water can be recycled through the RO unit 87 when the quality of the process water flowing from the series of RO membrane vessels 101 does not satisfy the quality standards for the process water in product tank 109.

As generally shown in FIG. 1, the seventh major step of multi-step system 10 preferably uses a calcium carbonate media called "calcite" to condition the process water flowing from the RO unit 87 to the product tank 109. This step occurs in a calcite tank 113 and is controllable by a bypass valve 114 that is remotely or manually controlled.

A preferred embodiment of the calcite tank 113 is shown in FIGS. 25 and 26. Calcite tank 113 preferably has an outer shell 127 and a riser tube 128 with a bell nozzle 129. Calcite tank 113 preferably contains calcite for reducing the aggressiveness of the high purity process water exiting the RO unit 87, for raising the pH of the process water which tends to be acidic after exiting the RO unit 87, for adding beneficial minerals back into the process water, for slightly raising the TDS in the process water, and for improving the taste of the process water.

A portion of the process water flowing from the RO unit 87 through process line 108 enters the top 115 of calcite tank 113. The remaining portion of the process water flowing from the RO unit 87 through process line 108 flows into a bypass line 116 and through bypass valve 114.

The amount of process water flowing through the bypass valve 114 is determined by the pH of the produced process water in product tank 109. The pH of the process water in product tank 109 is preferably measured using a pH sensor 122, as shown in FIG. 1. If the pH of the produced process water in product tank 109 gets too high above 7, then the amount of process water flowing through the bypass valve 114 is increased so that less process water flows through the calcite tank 113. In contrast, if the pH of the produced process water in product tank 109 gets too low below 7, then the amount of process water flowing through the bypass valve 114 is decreased so that more process water flows through the calcite tank 113.

The process water entering the calcite tank 113 flows to the bottom 117 of calcite tank 113 through riser tube 128 and bell nozzle 129. After exiting the bell nozzle 129, the process water flows upwardly through the calcium carbonate media inside calcite tank 113. The calcium carbonate media inside the calcite tank 113 is designed to increase the pH of the process water flowing through the calcite tank 113. The process water exits the top 115 of calcite tank 113 into process line 118, which joins the process water flowing through bypass line 116 and flows to the next step in the multi-step system 10 through process line 118, as shown in FIG. 1.

As generally shown in FIG. 1, the eighth major step of multi-step system 10 preferably uses an automated chlorine injection pump 119 to maintain consistent chlorine content in the produced process water in product tank 109. The chlorine is preferably stored in a chlorine tank 120 and is pumped through a chlorine injector 121 into the process water flowing through process line 118. Chlorine levels of the produced process water in product tank 109 are constantly monitored using a chlorine sensor 123 and an algorithm is used to automatically adjust the chlorine injection rate to ensure consistent chlorine levels in the produced process water in product tank 109.

The process water flowing through process line 118 after the chlorine injector 121 is potable water that is preferably free from any objectionable taste, odor, or color. The potable water is preferably stored in product tank 109, which is approximately 1500 gallons. From product tank 109, high-pressure pumps 124 are used to pump the potable water to various points of use, including but not limited to living quarters (not shown), an ice machine 131, potable water spouts (not shown), and an eyewash/safety shower (not shown).

As discussed above, several steps in the multi-step system 10 send rejected process water to the reject tank 112. The process water sent to reject tank 112 is temporarily stored in reject tank 112 until it can be sent to a designated location to be treated, reused, sold, and/or disposed.

The multi-step system 10 of the present invention preferably utilizes computer controls and monitoring sensors to ensure that the treatment process is functioning as expected. Computer controls are preferably remotely accessible and controllable with internet connectivity from anywhere cell signal or internet is available.

Water quality can be monitored for each treatment process and the final product water. Validation monitoring can last from a few days to up to several months. The data collected during these validation periods can serve as a baseline of system performance for future comparison. Long-term monitoring can be used to demonstrate the continuous production of high-quality water. Periodic grab sampling may complement online continuous monitoring of certain parameters. All monitoring tools are preferably calibrated regularly per manufacturer's guidelines.

The multi-step system 10 of the present invention preferably utilizes water level set-points to allow trained personnel to adjust the water levels when the system kicks on/off for producing potable water. Standard setting is preferably "on" at 1150 gallons and "off" at 1350 gallons. The multi-step system 10 of the present invention also preferably monitors chlorine concentration, pH, and hardness of water at all times.

It is understood that one embodiment of the present invention has been disclosed by way of example and that other modifications and alterations may occur to those skilled in the art without departing from the scope and spirit of the present invention.

What is claimed is:

1. A series of components for producing potable water from a raw water supply, comprising:
   (a) a sediment knockout tank equipped with an inlet process line, an outlet process line, and a waste process line, where said sediment knockout tank receives said raw water through said inlet process line, and where said sediment knockout tank removes substantially all of any sand, large sediments, and other particulates in said raw water inside said sediment knockout tank, after which said sediment knockout tank discharges a processed water through said outlet process line and periodically discharges said sand, large sediments, and other particulates removed from said raw water through said waste outlet line;
   (b) an oil filter tank equipped with an inlet process line and an outlet process line, where said oil filter tank receives said processed water from said outlet process line of said sediment knockout tank through said inlet process line of said oil filter tank, and where said oil filter tank removes substantially all of any oil in said processed water inside said oil filter tank, after which said oil filter tank discharges said processed water through said outlet process line of said oil filter tank;
   (c) a gas off tank equipped with an inlet process line, an outlet process line, a gas off valve, a drain line, and a top, where said gas off tank receives said processed water from said outlet process line of said oil filter tank through said inlet process line of said gas off tank, and where said gas off tank removes substantially all of any gas and particulates in said processed water inside said gas off tank, after which said gas off tank discharges said processed water through said outlet process line of said gas off tank, and said gas off tank discharges said gas removed from said processed water through said gas off valve, and said gas off tank periodically discharges said particulates removed from said processed water through said drain line;
   (d) an ozone generator for generating and supplying ozone into a slipstream of said processed water discharged from said gas off tank through said outlet process line of said gas off tank;
   (e) an oxygen concentrator for generating and supplying concentrated oxygen to said ozone generator;
   (f) a venturi injector for introducing said ozone generated and supplied by said ozone generator into said slipstream of said processed water discharged from said gas off tank;
   (g) a circulating pump for pumping said slipstream of said processed water discharged from said gas off tank through said venturi injector and back to said gas off tank through said inlet process line of said gas off tank, where said gas off tank removes substantially all of any gas and particulates in said slipstream inside said gas off tank, after which said gas off tank discharges said slipstream through said outlet process line of said gas off tank, and said gas off tank discharges said gas removed from said slipstream through said gas off valve, and said gas off tank periodically discharges said particulates removed from said slipstream through said drain line;

(h) a first filtration tank equipped with an inlet process line, an outlet process line, a backwash mechanism, a backwash process line, and a top, where said first filtration tank receives said processed water from said outlet process line of said gas off tank through said inlet process line of said first filtration tank, where said first filtration tank contains catalytic filtration media for removing oxidized iron, hydrogen sulfide, manganese, and other metals and particulate matter from said processed water received from said gas off tank, where said first filtration tank removes substantially all of any oxidized iron, hydrogen sulfide, manganese, and other metals and particulate matter from said processed water inside said first filtration tank, after which said first filtration tank discharges said processed water through said outlet process line of said first filtration tank, and said backwash mechanism periodically backwashes said oxidized iron, hydrogen sulfide, manganese, and other metals and particulate matter removed by said catalytic filtration media inside said first filtration tank, after which said backwash mechanism discharges said oxidized iron, hydrogen sulfide, manganese, and other metals and particulate matter removed by said catalytic filtration media through said backwash process line;

(i) a second filtration tank equipped with an inlet process line, an outlet process line, a backwash mechanism, a backwash process line, and a top, where said second filtration tank receives said processed water from said outlet process line of said first filtration tank through said inlet process line of said second filtration tank, where said second filtration tank contains a carbon filtration media for removing chemicals, sediments, and suspended minerals from said processed water received from said first filtration tank, where said second filtration tank removes substantially all of any chemicals, sediments, and suspended minerals from said processed water inside said second filtration tank, after which said second filtration tank discharges said processed water through said outlet process line of said second filtration tank, and said backwash mechanism periodically backwashes said chemicals, sediments, and suspended minerals removed by said carbon filtration media inside said second filtration tank, after which said backwash mechanism discharges said chemicals, sediments, and suspended minerals removed by said carbon filtration media through said backwash process line;

(j) a means for introducing an anti-scalant/dispersant into said processed water discharged through said outlet process line of said second filtration tank;

(k) a reverse osmosis unit equipped with an inlet process line and an outlet process line, where said reverse osmosis unit receives through said inlet process line of said reverse osmosis unit said processed water from said outlet process line of said second filtration tank that contains an anti-scalant/dispersant, where said reverse osmosis unit uses reverse osmosis to remove dissolved salts, such as sodium, potassium, and chloride, and other impurities such as bacteria, phosphates, nitrates, arsenic, and lead, from said processed water flowing through said reverse osmosis unit, after which said reverse osmosis unit discharges potable water through said outlet process line of said reverse osmosis unit;

(l) a calcite tank equipped with an inlet process line, an outlet process line, a second bypass line, and a top, where said calcite tank receives a slipstream of said potable water from said outlet process line of said reverse osmosis unit through said inlet process line of said calcite tank, where said calcite tank contains a calcium carbonate media for raising the pH and improving the taste of said potable water from said outlet process line of said reverse osmosis unit, after which said calcite tank discharges said slipstream of said potable water through said outlet process line of said calcite tank;

(m) a means for introducing chlorine into said potable water discharged from said outlet process line and said second bypass line of said calcite tank; and (n) a portable trailer for housing said series of components for producing potable water from a raw water supply.

2. The series of components of claim 1, further comprising:

(a) an oil absorbing bag inside a filter bag basket inside said oil filter tank;

(b) a riser tube extending down into said gas off tank from said top of said gas off tank;

(c) a first bypass line around said venturi injector, said first bypass line equipped with a first bypass valve to control the flow rate of processed water through said first bypass line to adjust the pressure differential across said venturi injector;

(d) a riser tube with a bell nozzle inside said first filtration tank, said riser tube extending down into said first filtration tank from said top of said first filtration tank;

(e) a riser tube with a bell nozzle inside said second filtration tank, said riser tube inside said second filtration tank extending down into said second filtration tank from said top of said second filtration tank;

(f) a pump for introducing an anti-scalant/dispersant into said processed water discharged through said outlet process line of said second filtration tank; and (g) a riser tube with a bell nozzle inside said calcite tank, said riser tube inside said calcite tank extending down into said calcite tank from said top of said calcite tank;

(h) a second bypass line around said calcite tank, said second bypass line equipped with a second bypass valve to control the flow rate of potable water through said second bypass line and through said calcite tank to adjust the pH of the potable water; and (g) a pump for introducing chlorine into said potable water discharged from said outlet process line and said second bypass line of said calcite tank.

3. The series of components of claim 2, where said ozone generator further comprises:

(a) a corona discharge cell enclosed in a manifold assembly;

(b) a high voltage cap assembly on top of said manifold assembly;

(c) a high voltage transformer with a high voltage wire connecting said high voltage transformer to said high voltage cap assembly;

(d) an oxygen supply line connected to said manifold assembly; and (e) an ozone outline line connected to said manifold assembly.

4. The series of components of claim 3, where said reverse osmosis unit further comprises:
(a) a prefilter housing for receiving processed water discharged from said second filtration tank, said prefilter housing containing a prefilter;
(b) a pump for pumping processed water discharged from said prefilter housing; and
(c) a series of reverse osmosis membrane vessels for receiving processed discharged from said pump for pumping processed water discharged from said prefilter housing, where each membrane vessel in said series of membrane vessels contains a reverse osmosis membrane designed to remove dissolved salts, such as sodium, potassium, and chloride, and other impurities, such as bacteria, phosphates, nitrates, arsenic, and lead, from the processed water flowing through said reverse osmosis membrane.

5. The series of components of claim 4, where said oil absorbing bag inside said filter bag basket inside said oil filter tank is made from polypropylene micro-fibers designed to remove at least 97% of the oil from the processed water flowing through said oil filter tank.

6. The series of components of claim 5, further comprising:
(a) a flow meter installed in said outlet process line of said sediment knockout tank to measure the flow rate of processed water flowing from said sediment knockout tank to said oil filter tank;
(b) a pressure sensor installed in said outlet process line of said sediment knockout tank to measure the pressure of processed water flowing from said sediment knockout tank to said oil filter tank;
(c) a pressure sensor for monitoring the discharge pressure of said circulating pump for pumping said slipstream of said processed water discharged from said gas off tank through said venturi injector and back to said gas off tank through said inlet process line of said gas off tank;
(d) a flow sensor/switch installed in said outlet process line of said gas off tank for monitoring the flow rate of processed water through said outlet process line of said gas off tank, and for activating said ozone generator, said oxygen concentrator, and said circulating pump for pumping said slipstream of said processed water discharged from said gas off tank, when said flow sensor/switch detects a flow rate of processed water through said outlet process line of said gas off tank, and for deactivating said ozone generator, said oxygen concentrator, and said circulating pump for pumping said slipstream of said processed water discharged from said gas off tank, when said flow sensor/switch detects no flow rate of processed water through said outlet process line of said gas off tank;
(e) a first micro switch connected to said backwash mechanism on said first filtration tank for stopping the flow of processed water and potable water through said series of components for producing potable water from a raw water supply when said first filtration tank is in backwash mode; and
(f) a second micro switch connected to said backwash mechanism on said second filtration tank for stopping the flow of processed water and potable water through said series of components for producing potable water from a raw water supply when said second filtration tank is in backwash mode.

7. The series of components of claim 6, further comprising:
(a) a third bypass line around said reverse osmosis unit, said third bypass line equipped with a third bypass valve to control the flow rate of processed water through said third bypass line;
(b) a first TDS sensor for measuring totaled dissolved solids in the processed water entering said reverse osmosis unit;
(c) a second TDS sensor for measuring totaled dissolved solids in the potable water discharged from said reverse osmosis unit;
(d) a controller for controlling the operation of the reverse osmosis unit;
(e) an inlet pressure gauge and an outlet pressure gauge installed on said prefilter housing in said reverse osmosis unit to determine the differential pressure in said prefilter housing;
(f) an automatic valve to control the flow of the processed water discharged from said prefilter housing;
(g) a pressure sensor to monitor the pressure of the processed water discharged from said prefilter housing in said reverse osmosis unit, where said pressure sensor sends a signal to said controller to shut down said pump for pumping processed water discharged from said prefilter housing and to close said automatic valve when the pressure of the processed water discharged from said prefilter housing falls below ten 10 psig;
(h) an electric motor to drive said pump for pumping processed water discharged from said prefilter housing; and
(i) a pressure gauge for monitoring the discharge pressure of said pump for pumping processed water discharged from said prefilter housing.

8. The series of components of claim 7, further comprising:
(a) a first flow meter for measuring the flow rate of potable water discharged from said reverse osmosis unit;
(b) a second flow meter for measuring the flow rate of rejected processed water discharged from said reverse osmosis unit; and
(c) a third flow meter for measuring the flow rate of processed water recycled through said reverse osmosis unit.

9. The series of components of claim 8, further comprising:
(a) a pH sensor for measuring the pH of potable water discharged from said calcite tank; and
(b) a chlorine sensor for measuring the chlorine concentration of potable water after chlorine is introduced into said potable water discharged from said outlet process line and said second bypass line of said calcite tank.

10. The series of components of claim 9, further comprising:
(a) a storage tank for storing said potable water discharged from said outlet process line and said second bypass line of said calcite tank;
(b) a reject tank for storing processed water rejected from said series of components;
(c) one or more pumps from pumping potable water from said storage tank to living quarters, an ice machine, one or more water spouts, and an eye wash/safety shower station.

11. The series of components of claim 10, further comprising a computer control system for providing onsite and remote monitoring and controlling of said series of components.

12. A multi-step method for producing potable water from raw water, comprising the steps of:
  (a) removing substantially all of any sand, large sediments, and other particulates in said raw water by flowing said raw water through a sediment knockout tank, after which said raw water is discharged from said sediment knockout tank as processed water;
  (b) removing substantially all of any oil in said processed water discharged from said sediment knockout tank by flowing said processed water through an oil filter tank, after which said processed water is discharged from said oil filter tank;
  (c) removing substantially all of any gas and particulates in said processed water discharged from said oil filter tank by flowing said processed water through a gas off tank, after which said processed water is discharged from said gas off tank;
  (d) using a venturi injector to supply ozone from an ozone generator into a slipstream of said processed water discharged from said gas off tank, after which said slipstream of said processed water is returned to said gas off tank;
  (e) supplying concentrated oxygen from an oxygen concentrator to said ozone generator;
  (f) removing oxidized iron, hydrogen sulfide, manganese, and other metals and particular matter in said processed water discharged from said off gas tank by flowing said processed water through a first filtration tank containing a catalytic filtration media designed to remove oxidized iron, hydrogen sulfide, manganese, and other metals and particulate matter from said processed water discharged from said off gas tank, after which said processed water is discharged from said first filtration tank;
  (g) removing chemicals, sediments, and suspended minerals in said processed water discharged from said first filtration tank by flowing said processed water through a second filtration tank containing a carbon filtration media designed to remove chemicals, sediments, and suspended minerals from said processed water discharged from said first filtration tank, after which said processed water is discharged from said second filtration tank;
  (h) introducing an anti-scalant/dispersant into said processed water discharged from said second filtration tank;
  (i) using reverse osmosis in a reverse osmosis unit to remove dissolved salts, such as sodium, potassium, and chloride, and other impurities such as bacteria, phosphates, nitrates, arsenic, and lead, from said processed water discharged from said second filtration tank, after which said processed water is discharged from said reverse osmosis unit as potable water;
  (j) raising the pH and improving the taste of said potable water discharged from said reverse osmosis unit by flowing a slipstream of said potable water discharged from said reverse osmosis unit through said calcite tank containing a calcium carbonate media, after which said slipstream of said potable water is discharged from said calcite tank;
  (k) introducing chlorine into said potable water discharged from said reverse osmosis unit and discharge from said calcite tank.

13. The multi-step method of claim 12, further comprising the steps of:
  (a) adjusting the pressure differential across said venturi injection by providing a first bypass line around said venturi injector, where said first bypass line is equipped with a first bypass valve to control the flow rate of processed water through said first bypass line;
  (b) controlling the flow rate of said potable water throw said calcite tank by providing a second bypass line around said calcite tank, where said second bypass line equipped with a second bypass valve to control the flow rate of potable water through said second bypass line.

14. The multi-step method of claim 13, further comprising the step of providing oil absorbing bag inside said filter bag basket inside said oil filter tank that is made from polypropylene micro-fibers designed to remove at least 97% of the oil from the processed water flowing through said oil filter tank.

15. The multi-step method of claim 14, further comprising the steps of:
  (a) providing a flow meter installed in said outlet process line of said sediment knockout tank to measure the flow rate of processed water flowing from said sediment knockout tank to said oil filter tank;
  (b) providing a pressure sensor installed in said outlet process line of said sediment knockout tank to measure the pressure of processed water flowing from said sediment knockout tank to said oil filter tank;
  (c) providing a pressure sensor for monitoring the discharge pressure of said circulating pump for pumping said slipstream of said processed water discharged from said gas off tank through said venturi injector and back to said gas off tank through said inlet process line of said gas off tank;
  (d) providing a flow sensor/switch installed in said outlet process line of said gas off tank for monitoring the flow rate of processed water through said outlet process line of said gas off tank, and for activating said ozone generator, said oxygen concentrator, and said circulating pump for pumping said slipstream of said processed water discharged from said gas off tank, when said flow sensor/switch detects a flow rate of processed water through said outlet process line of said gas off tank, and for deactivating said ozone generator, said oxygen concentrator, and said circulating pump for pumping said slipstream of said processed water discharged from said gas off tank, when said flow sensor/switch detects no flow rate of processed water through said outlet process line of said gas off tank;
  (e) providing a first micro switch connected to said backwash mechanism on said first filtration tank for stopping the flow of processed water and potable water through said series of components for producing potable water from a raw water supply when said first filtration tank is in backwash mode; and
  (f) providing a second micro switch connected to said backwash mechanism on said second filtration tank for stopping the flow of processed water and potable water through said series of components for producing potable water from a raw water supply when said second filtration tank is in backwash mode.

16. The multi-step method of claim 15, further comprising the steps of:
  (a) measuring totaled dissolved solids in the processed water entering said reverse osmosis unit; and
  (b) measuring totaled dissolved solids in the potable water discharged from said reverse osmosis unit.

17. The multi-step method of claim 16, further comprising the steps of:
  (a) measuring the pH of potable water discharged from said calcite tank; and (b) measuring the chlorine concentration of potable water after chlorine is introduced into said potable water.

18. The multi-step method of claim 17, further comprising the steps of:
(a) providing a storage tank for storing said potable water discharged from said outlet process line and said second bypass line of said calcite tank;
(b) providing a reject tank for storing processed water rejected from said series of components;
(c) providing one or more pumps from pumping potable water from said storage tank to living quarters, an ice machine, one or more water spouts, and an eye wash/safety shower station.

19. A series of components for producing potable water from a raw water supply, comprising:
(a) a sediment knockout tank for removing substantially all of any sand, large sediments, and other particulates in said raw water flowing through said sediment knockout tank;
(b) an oil filter tank for removing substantially all of any oil in said raw water discharged from said sediment knockout tank and flowing through said oil filter tank;
(c) a gas off tank for removing substantially all of any gas and particulates in said raw water discharged from said oil filter tank and flowing through said gas off tank;
(d) an ozone generator for generating and supplying ozone into a slipstream of said raw water discharged from said gas off tank;
(e) an oxygen concentrator for generating and supplying concentrated oxygen to said ozone generator;
(f) a venturi injector for introducing said ozone generated and supplied by said ozone generator into said slipstream of said processed water discharged from said gas off tank;
(g) a circulating pump for pumping said slipstream of said processed water discharged from said gas off tank through said venturi injector and back to said gas off tank through said inlet process line of said gas off tank;
(h) a first filtration tank containing a catalytic filtration media for removing oxidized iron, hydrogen sulfide, manganese, and other metals and particulate matter from said raw water discharged from said gas off tank and flowing through said first filtration tank;
(i) a second filtration tank containing a carbon filtration media for removing chemicals, sediments, and suspended minerals from said raw water discharged from said first filtration tank and flowing through said second filtration tank;
(j) a means for introducing an anti-scalant/dispersant into said raw water discharged from said second filtration tank;
(k) a reverse osmosis unit for producing potable water by removing dissolved salts, such as sodium, potassium, and chloride, and other impurities such as bacteria, phosphates, nitrates, arsenic, and lead, from said raw water discharged from said second filtration tank and flowing through said reverse osmosis unit;
(l) a calcite tank containing a calcium carbonate media for raising the pH and improving the taste of said potable water discharged from said reverse osmosis unit and flowing through said calcite tank;
(m) a means for introducing chlorine into said potable water discharged from said calcite tank; and
(n) a portable trailer for housing said series of components for producing potable water from a raw water.

20. A multi-step method for producing potable water from raw water, comprising the steps of:
(a) removing substantially all of any sand, large sediments, and other particulates in said raw water by flowing said raw water through a sediment knockout tank, after which said raw water is discharged from said sediment knockout tank;
(b) removing substantially all of any oil in said raw water discharged from said sediment knockout tank by flowing said raw water discharged from said sediment knockout tank through an oil filter tank, after which said raw water is discharged from said oil filter tank;
(c) removing substantially all of any gas and particulates in said raw water discharged from said oil filter tank by flowing said raw water discharged from said oil filter tank through said gas off tank, after which said raw water is discharged from said gas off tank;
(d) supplying ozone into a slipstream of said raw water discharged from said gas off tank by providing an ozone generator;
(e) removing oxidized iron, hydrogen sulfide, manganese, and other metals and particulate matter from said raw water discharged from said gas off tank by flowing said raw water discharged from said gas off tank through a first filtration tank, after which said raw water is discharged from said first filtration tank;
(f) removing chemicals, sediments, and suspended minerals from said raw water discharged from said first filtration tank by flowing said raw water discharged from said first filtration tank through a second filtration tank, after which said raw water is discharged from said second filtration tank;
(g) introducing an anti-scalant/dispersant into said raw water discharged from said second filtration tank;
(h) removing dissolved salts, such as sodium, potassium, and chloride, and other impurities such as bacteria, phosphates, nitrates, arsenic, and lead, from said raw water discharged from said second filtration tank by flowing said raw water discharged from said second filtration tank through a reverse osmosis unit;
(i) raising the pH and improving the taste of said raw water discharged from said reverse osmosis unit by flowing said raw water discharged from said reverse osmosis unit through a calcite tank containing a calcium carbonate media, after which said raw water is discharged from said calcite tank;
(j) introducing chlorine into said raw water discharged from said calcite tank.

* * * * *